(12) United States Patent
Palys et al.

(10) Patent No.: US 11,845,838 B2
(45) Date of Patent: Dec. 19, 2023

(54) COMPOSITIONS AND METHODS FOR CROSSLINKING POLYMERS IN THE PRESENCE OF ATMOSPHERIC OXYGEN

(71) Applicant: Arkema Inc., King of Prussia, PA (US)

(72) Inventors: Leonard H. Palys, Downingtown, PA (US); Peter R. Dluzneski, Harleysville, PA (US); William P. Pavlek, Stevens, PA (US); Alfredo Defrancisci, Lyons (FR); Feng-Jon Chang, Taipei (TW); Marina Despotopoulou, Havertown, PA (US); Michael B Abrams, Bala Cynwyd, PA (US); Joseph M. Brennan, Swarthmore, PA (US); Isabelle Tartarin, Oullins (FR)

(73) Assignee: Arkema Inc., King of Prussia, PA (US)

( * ) Notice: Subject to any disclaimer, the term of this patent is extended or adjusted under 35 U.S.C. 154(b) by 440 days.

(21) Appl. No.: 16/897,469

(22) Filed: Jun. 10, 2020

(65) Prior Publication Data
US 2020/0299469 A1 Sep. 24, 2020

Related U.S. Application Data

(62) Division of application No. 16/400,276, filed on May 1, 2019, now Pat. No. 10,717,829, which is a division of application No. 15/531,746, filed as application No. PCT/US2015/063615 on Dec. 3, 2015, now Pat. No. 10,316,154.

(60) Provisional application No. 62/089,421, filed on Dec. 9, 2014.

(51) Int. Cl.
| | |
|---|---|
| C08K 5/14 | (2006.01) |
| C08K 5/524 | (2006.01) |
| C08J 3/24 | (2006.01) |
| C08L 23/16 | (2006.01) |
| C08K 5/08 | (2006.01) |
| C08K 5/205 | (2006.01) |
| C08K 5/32 | (2006.01) |
| C08K 5/3435 | (2006.01) |
| C08K 5/36 | (2006.01) |
| C08K 5/11 | (2006.01) |
| C08K 5/3437 | (2006.01) |
| C08K 5/3492 | (2006.01) |
| C08K 5/40 | (2006.01) |
| C08K 5/47 | (2006.01) |

(52) U.S. Cl.
CPC .............. C08J 3/242 (2013.01); C08K 5/08 (2013.01); C08K 5/11 (2013.01); C08K 5/14 (2013.01); C08K 5/205 (2013.01); C08K 5/32 (2013.01); C08K 5/3435 (2013.01); C08K 5/3437 (2013.01); C08K 5/34924 (2013.01); C08K 5/36 (2013.01); C08K 5/524 (2013.01); *C08J 2323/16* (2013.01); *C08K 5/40* (2013.01); *C08K 5/47* (2013.01); *C08K 2201/019* (2013.01)

(58) Field of Classification Search
CPC .................................. C08K 5/14; C08K 5/524
See application file for complete search history.

(56) References Cited

U.S. PATENT DOCUMENTS

| | | | |
|---|---|---|---|
| 2,842,520 A | 7/1958 | Polmanteer et al. | |
| 4,129,700 A | 12/1978 | Mageli et al. | |
| 4,376,184 A | 3/1983 | Itoh et al. | |
| 4,655,962 A * | 4/1987 | Rowland | C08J 9/103 516/11 |
| 4,983,685 A * | 1/1991 | Aoshima | C08K 5/14 525/329.2 |
| 5,084,924 A | 2/1992 | Spitz | |
| 5,091,471 A * | 2/1992 | Graves | C08L 23/26 525/89 |
| 5,096,947 A | 3/1992 | Bohen et al. | |
| 5,120,779 A | 6/1992 | Cornell et al. | |
| 5,219,904 A | 6/1993 | Abe et al. | |
| 6,187,859 B1 | 2/2001 | Humphrey et al. | |
| 6,559,260 B1 | 5/2003 | Fan et al. | |
| 6,747,099 B1 | 6/2004 | Novits | C08K 5/0025 525/330.4 |
| 6,767,940 B2 | 7/2004 | Voorheis et al. | |
| 6,775,848 B2 | 8/2004 | McGlothlin et al. | |
| 7,211,611 B2 | 5/2007 | Wilson, III | |
| 7,829,634 B2 | 11/2010 | Debaud et al. | |
| 8,298,617 B2 | 10/2012 | Bouwmeester et al. | |
| 2004/0019138 A1 | 1/2004 | Voorheis et al. | |
| 2006/0270783 A1 | 11/2006 | Beck | |
| 2011/0147986 A1 | 6/2011 | D'Angelo | |
| 2013/0131221 A1 | 5/2013 | Basu et al. | |
| 2016/0002383 A1 | 1/2016 | Beek | |

FOREIGN PATENT DOCUMENTS

| | | | | |
|---|---|---|---|---|
| CN | 1546561 A | | 11/2004 | |
| CN | 102417561 B | * | 9/2013 | ......... B29C 47/0011 |
| EP | 940436 A1 | * | 9/1999 | .......... C08K 5/0025 |
| EP | 0 246 745 B2 | | 1/2001 | |
| JP | 2001214011 | | 4/2000 | |
| JP | 2000103917 | | 11/2000 | |

(Continued)

OTHER PUBLICATIONS

Akrochem's Technical Paper Entitled "Peroxide Curing—Ways to Manipulate and Improve Peroxide-Cured Rubber", available at akrochem.com, downloaded Dec. 15, 2022.*

*Primary Examiner* — Vu A Nguyen
(74) *Attorney, Agent, or Firm* — Lynn B. Morreale

(57) ABSTRACT

Embodiments of organic peroxide formulations provide significant improvements in surface tackiness (often including tack-free surfaces) when curing elastomers in the presence of oxygen. The peroxide formulations may include, for example, one or more compounds selected from sulfur-containing compounds, organophosphite compounds, HALS (Hindered Amine Light Stabilizer) compounds, aliphatic allyl urethane compounds, and blends comprising nitroxides (e.g., 4-hydroxy-TEMPO) and quinones (e.g., mono-tert-butylhydroquinone).

11 Claims, No Drawings

(56) References Cited

FOREIGN PATENT DOCUMENTS

| KR | 20080004184 A | * | 1/2008 | ............... C08L 33/00 |
| WO | WO-0134680 A1 | * | 5/2001 | ............ C08K 5/0025 |
| WO | WO-2010055840 A1 | * | 5/2010 | ....... B32B 17/10678 |
| WO | WO 2014/158665 A1 | | 10/2014 | |

* cited by examiner

COMPOSITIONS AND METHODS FOR CROSSLINKING POLYMERS IN THE PRESENCE OF ATMOSPHERIC OXYGEN

CROSS-REFERENCE TO RELATED APPLICATIONS

This application is a divisional of U.S. application Ser. No. 16/400,276, filed May 1, 2019, which is a divisional of U.S. application Ser. No. 15/531,746, filed May 31, 2017, now, U.S. Pat. No. 10,316,154, which is a national stage application under 35 U.S.C. § 371 of PCT/US2015/063615, filed Dec. 3, 2015, which claims benefit to U.S. Provisional Application No. 62/089,421, filed on Dec. 9, 2014.

FIELD OF THE INVENTION

The present invention relates to compositions and methods for crosslinking elastomers with organic peroxides in the presence of atmospheric oxygen, and products made by those methods.

BACKGROUND OF THE INVENTION

Polymers and copolymers crosslinked with organic peroxides are known to have superior properties, particularly compared to polymers crosslinked by sulfur cure. These properties include high heat ageing resistance, low percent compression set, decreased staining of metal, and easy production of colored products with enhanced color stability. In view of these beneficial properties, peroxide cure has a great deal of practical importance. A possible drawback of peroxide cure is that air must be excluded from the surface of a material during cure; if the air is not excluded, a tacky surface may result, due to cure inhibition by oxygen.

When oxygen comes into contact with an elastomer being crosslinked by an organic peroxide, the crosslinking reaction at the elastomer surface may be inhibited, or may not take place at all. Thus, the elastomer surface remains uncured. Therefore, curing rubber articles with peroxides is typically conducted in steam tubes, molten salt baths, steam autoclaves, and air-evacuated closed molds, all of which are designed to apply heat to the elastomer while excluding atmospheric oxygen during the crosslinking process.

Unfortunately, excluding air from these commercial processes involves considerable time and expense. In contrast, sulfur vulcanization of elastomers can be conducted using lower cost hot air ovens or tubes in which hot atmospheric oxygen poses no issue. While the sulfur curatives are generally lower in cost than organic peroxides, the types of elastomers suitable for sulfur cure are limited to unsaturated elastomers, e.g., poly(ethylene propylene diene), poly(butadiene), natural rubber, synthetic poly(isoprene), poly(styrene-butadiene) rubber, poly(butadiene-acrylonitrile) rubber and the like.

In many cases, manufacturers would like to switch from sulfur to peroxide cure using existing hot air ovens; however, curing with conventional peroxide systems under these circumstances would not be viable due to the surface cure inhibition by oxygen. Various methods have been suggested for preventing surface cure inhibition by oxygen during free radical crosslinking. These methods have, for various reasons, generally met with little or no success.

U.S. Pat. No. 6,747,099 is directed to elastomer compositions that include bis-, tri- or higher polymaleimides and/or bis-, tri- or higher polycitraconimides.

U.S. Pat. No. 4,983,685 is directed to elastomer compositions that include at least 2.5 to 20 phr (parts per hundred rubber) of benzothiazyl disulfide.

U.S. Pat. No. 6,775,848 is directed to pore-free rubber articles prepared by dip-molding.

U.S. Pat. No. 4,376,184 is directed to rubber compositions that include an organopolysiloxane gum.

EP 0246745 is directed to elastomer compositions that include low molecular weight polymers of 1,000 to 15,000 as an additive.

U.S. Pat. No. 5,219,904 is directed to fluorine-containing elastomers that contain iodine and bromine.

U.S. Publication No. 2013/0131221 is directed to elastomer compositions that include at least one cellulose ester.

Generally, none of the previously described systems have adequately provided a tack-free surface while concurrently providing desirable physical properties like superior compression. Moreover, previous known methods involving sulfur and peroxide cure are limited to unsaturated elastomers.

Thus, it is desirable to have organic peroxide formulations and methods which cure commercially available crosslinkable elastomers and polymers, both saturated and unsaturated, in the full or partial presence of atmospheric oxygen.

SUMMARY OF THE INVENTION

Embodiments of the present invention relate to organic peroxide formulations that can cure solid elastomers in the full or partial presence of oxygen using, for example, a hot air oven or tunnel, or steam autoclave. Embodiments of the invention also relate to crosslinkable elastomer compositions, processes for curing the elastomers, and products made by such processes.

The applicants have discovered several compounds that can be combined with organic peroxides to significantly reduce the surface tackiness of elastomeric articles cured in the presence of oxygen. Non-limiting examples of these compounds, which can be blended with organic peroxides to produce peroxide formulations of the present invention, include: sulfur-containing compounds, organophosphite compounds, HALS (Hindered Amine Light Stabilizer) compounds, aliphatic allyl urethane compounds, and blends comprising 4-hydroxy-TEMPO (4-OHT), mono-tert-butyl-hydroquinone (MTBHQ), and at least one sulfur-containing compound. Without being bound by any theory, it is believed that these compounds support or enhance the desirable surface cure of elastomers when used with at least one organic peroxide in the presence of oxygen.

In accordance with one embodiment, the applicants have discovered that organic peroxide formulations having at least one sulfur-containing compound can significantly reduce the surface tackiness of an elastomeric article that is peroxide cured in the full or partial presence of oxygen, particularly when the formulations do not include certain monomeric co-agents. For example, it was surprisingly found that organic peroxide formulations that contain at least one sulfur-containing compound, but that do not contain any bis-, tri- or higher poly-maleimides (e.g., N,N'-m-phenylene bismaleimide, also referred to as HVA-2), or any bis-, or tri- or higher poly-citraconimides, can virtually eliminate the surface tackiness of an elastomeric article that is peroxide cured in an open air system, and can also provide high crosslink density, high tensile strength, and low % compression sets. This is contrary to other systems, such as those described in U.S. Pat. No. 6,747,099, which specifically includes the costly N,N'-m-phenylene bismaleimide (HVA-2) compound as a required part of the peroxide formulation to provide a tack-free surface in the presence of hot air while reducing % compression set values.

Embodiments of the present invention relate to an organic peroxide formulation comprising, consisting essentially of, or consisting of at least one organic peroxide and at least one sulfur-containing compound, wherein the formulation does not include any bis-, tri- or higher poly-maleimides, or bis-, tri- or higher poly-citraconimides. The amounts of the at least one organic peroxide and the at least one sulfur-containing compound are selected such that the formulation is capable of curing an elastomer composition in the full or partial presence of oxygen (e.g., using a hot air oven or tunnel, or steam autoclave).

Embodiments of the present invention also relate to an elastomer composition comprising, consisting essentially of, or consisting of at least one elastomer, at least one peroxide, and at least one sulfur-containing compound, wherein the elastomer composition does not include any bis-, tri- or higher poly-maleimides, or bis-, tri- or higher poly-citraconimides, and wherein the elastomer composition is curable in the full or partial presence of oxygen.

Embodiments of the present invention also relate to a process for curing an elastomer composition, said process comprising, consisting essentially of, or consisting of curing an elastomer composition in the presence of oxygen, wherein the elastomer composition comprises, consists essentially of, or consists of at least one elastomer, at least one organic peroxide and at least one sulfur-containing compound, wherein the elastomer composition does not include any bis-, tri- or higher poly-maleimides, or bis-, tri- or higher poly-citraconimides. Embodiments of the present invention also relate to products made by this process.

The applicants have also discovered that organic peroxide formulations having at least one organophosphite compound can significantly reduce the surface tackiness of an elastomeric article that is peroxide cured in the full or partial presence of oxygen. Such peroxide formulations can provide a tack-free surface, or substantially tack-free surface, when curing an elastomer composition in the presence of hot air.

Embodiments of the present invention relate to an organic peroxide formulation comprising, consisting essentially of, or consisting of at least one organic peroxide and at least one organophosphite compound. The amounts of the at least one organic peroxide and the at least one organophosphite compound are selected such that the formulation is capable of curing an elastomer composition in the full or partial presence of oxygen (e.g., using a hot air oven or tunnel, or steam autoclave).

Embodiments of the present invention also relate to an elastomer composition comprising, consisting essentially of, or consisting of at least one elastomer, at least one peroxide, and at least one organophosphite compound wherein the elastomer composition is curable in the full or partial presence of oxygen.

Embodiments of the present invention also relate to a process for curing an elastomer composition, said process comprising, consisting essentially of, or consisting of curing an elastomer composition in the presence of oxygen, wherein the elastomer composition comprises, consists essentially of, or consists of at least one elastomer, at least one organic peroxide and at least one organophosphite compound. Embodiments of the present invention also relate to products made by this process.

The applicants have also discovered that organic peroxide formulations having at least one HALS (Hindered Amine Light Stabilizer) compound can significantly reduce the surface tackiness of an elastomeric article that is peroxide cured in the full or partial presence of oxygen. Such peroxide formulations can provide a tack-free surface, or substantially tack-free surface, when curing an elastomer composition in the presence of hot air.

Embodiments of the present invention relate to an organic peroxide formulation comprising, consisting essentially of, or consisting of at least one organic peroxide and at least one HALS compound. The amounts of the at least one organic peroxide and the at least one HALS compound are selected such that the formulation is capable of curing an elastomer composition in the full or partial presence of oxygen (e.g., using a hot air oven or tunnel, or steam autoclave).

Embodiments of the present invention also relate to an elastomer composition comprising, consisting essentially of, or consisting of at least one elastomer, at least one peroxide, and at least one HALS compound wherein the elastomer composition is curable in the full or partial presence of oxygen.

Embodiments of the present invention also relate to a process for curing an elastomer composition, said process comprising, consisting essentially of, or consisting of curing an elastomer composition in the presence of oxygen, wherein the elastomer composition comprises, consists essentially of, or consists of at least one elastomer, at least one organic peroxide and at least one HALS compound. Embodiments of the present invention also relate to products made by this process.

The applicants have also discovered that organic peroxide formulations having an aliphatic allyl urethane compound can significantly reduce the surface tackiness of an elastomeric article that is peroxide cured in the full or partial presence of oxygen. Such peroxide formulations can provide a tack-free surface, or substantially tack-free surface, when curing an elastomer composition in the presence of hot air.

Embodiments of the present invention relate to an organic peroxide formulation comprising, consisting essentially of, or consisting of at least one organic peroxide and at least one aliphatic allyl urethane compound. The amounts of the at least one organic peroxide and the at least one aliphatic allyl urethane compound are selected such that the formulation is capable of curing an elastomer composition in the full or partial presence of oxygen (e.g., using a hot air oven or tunnel, or steam autoclave).

Embodiments of the present invention also relate to an elastomer composition comprising, consisting essentially of, or consisting of at least one elastomer, at least one peroxide, and at least one aliphatic allyl urethane compound wherein the elastomer composition is curable in the full or partial presence of oxygen.

Embodiments of the present invention also relate to a process for curing an elastomer composition, said process comprising, consisting essentially of, or consisting of curing an elastomer composition in the presence of oxygen, wherein the elastomer composition comprises, consists essentially of, or consists of at least one elastomer, at least one organic peroxide and at least one aliphatic allyl urethane compound. Embodiments of the present invention also relate to products made by this process.

The applicants have also discovered that organic peroxide formulations having a blend of at least one nitroxide-containing compound (for example, 4-hydroxy-TEMPO (4-OHT)), at least one quinone-containing compound (preferably mono-tert-butylhydroquinone or MTBHQ), and at least one sulfur-containing compound can significantly reduce the surface tackiness of an elastomeric article that is peroxide cured in the full or partial presence of oxygen.

Such peroxide formulations can provide a tack-free surface, or substantially tack-free surface, when curing an elastomer composition in the presence of hot air, and can also provide improved scorch times and cure times.

Embodiments of the present invention relate to an organic peroxide formulation comprising, consisting essentially of, or consisting of at least one organic peroxide, at least one nitroxide-containing compound (e.g., 4-hydroxy-TEMPO), at least one quinone-containing compound (e.g., MTBHQ), and at least one sulfur-containing compound. The amounts of the at least one organic peroxide, the 4-OHT, the at least one quinone, and the at least one sulfur-containing compound are selected such that the formulation is capable of curing an elastomer composition in the full or partial presence of oxygen (e.g., using a hot air oven or tunnel, or steam autoclave).

Embodiments of the present invention also relate to an elastomer composition comprising, consisting essentially of, or consisting of at least one elastomer, at least one peroxide, 4-OHT, at least one quinone (e.g., MTBHQ), and at least one sulfur-containing compound, wherein the elastomer composition is curable in the full or partial presence of oxygen.

Embodiments of the present invention also relate to a process for curing an elastomer composition, said process comprising, consisting essentially of, or consisting of curing an elastomer composition in the presence of oxygen, wherein the elastomer composition comprises, consists essentially of, or consists of at least one elastomer, at least one organic peroxide, 4-OHT, at least one quinone (e.g., MTBHQ), and at least one sulfur-containing compound. Embodiments of the present invention also relate to products made by this process.

DETAILED DESCRIPTION

The applicants have discovered organic peroxide formulations that provide significant improvements in surface tackiness (often including tack-free surfaces) when curing elastomers in the full or partial presence of oxygen (e.g., using a hot air oven or tunnel, or a steam autoclave). Therefore, organic peroxide compositions of the present invention can replace sulfur vulcanization in cure processes where oxygen (e.g., atmospheric oxygen) may be present in various amounts.

When heat and pressure are applied to a sulfur-cured elastomer, the sulfur bonds typically break and re-form, causing the elastomer to deform. One test to measure this deformation is called percentage (%) compression set test. The greater the crosslinked elastomer specimen exhibits permanent deformation under heat and pressure, the higher the % compression set value. Thus, lower % compression set values, equating to less or no permanent elastomer deformation, are desirable for many elastomers, particularly for hose, gasket and sealing applications.

Elastomers that are cured using organic peroxide compositions of the present invention may include both solid unsaturated elastomers, solid saturated elastomers, or combinations thereof. U.S. Pat. No. 6,747,099, which is incorporated by reference herein, discloses the use of organic peroxides in the presence of air. Embodiments of the present invention provide improvements over formulations taught in U.S. Pat. No. 6,747,099, which do not provide sufficiently tack-free surfaces when elastomers with little or no unsaturation are used (e.g., poly(ethylene propylene) (EPM)). For example, embodiments of the present invention can obtain surface cures with blends of ethylene-propylene-diene terpolymer (EPDM) and poly(ethylene propylene) (EPM) (thus significantly reduced unsaturation) substantially identical to those obtained with elastomers that have high unsaturation, such as EPDM. Thus, embodiments of the invention are not limited by the unsaturation level of elastomers.

One aspect of the present invention relates to an organic peroxide formulation comprising, consisting essentially of, or consisting of, at least one organic peroxide and at least one sulfur-containing compound, wherein the formulation does not include any bis-, tri- or higher poly-maleimides, or bis-, tri- or higher poly-citraconimides.

A second aspect of the present invention relates to an organic peroxide formulation comprising, consisting essentially of, or consisting of at least one organic peroxide and at least one organophosphite compound.

A third aspect of the present invention relates to an organic peroxide formulation comprising, consisting essentially of, or consisting of at least one organic peroxide and at least one HALS compound (Hindered Amine Light Stabilizer).

A fourth aspect of the present invention relates to an organic peroxide formulation comprising, consisting essentially of, or consisting of at least one organic peroxide and at least one aliphatic allyl urethane compound.

A fifth aspect of the present invention relates to an organic peroxide formulation comprising, consisting essentially of, or consisting of at least one organic peroxide and at least one nitroxide-containing compound (e.g., 4-hydroxy-TEMPO (4-OHT)) blended with at least one quinone-containing compound (e.g., mono-tert-butylhydroquinone (MTBHQ)) and at least one sulfur-containing compound.

According to particular embodiments, the organic peroxide formulations of the present invention are capable of providing a completely or substantially tack-free cured elastomer composition. As used herein, an elastomer composition that is substantially tack-free has a surface tackiness of between 7 and 9.9 or 10, preferably between 8 and 9.9 or 10, more preferably between 9 and 9.9 or 10. An elastomer composition that is completely tack-free has a surface tackiness of 10 and is most desireable. A method for measuring surface tackiness is provided herein, and is referred to as the Facial Tissue Paper Test.

According to particular embodiments, the organic peroxide formulations of the present invention are capable of curing an elastomer composition that includes at least one saturated elastomer (e.g., a blend of at least one saturated elastomer and at least one unsaturated elastomer) in the full or partial presence of oxygen, wherein the cured elastomer composition is completely or substantially tack-free.

Organic Peroxides Suitable for Use in Embodiments of the Present Invention

With the exception of hydroperoxides and liquid peroxydicarbonates, all those organic peroxides known to undergo decomposition by heat to generate radicals capable of initiating the desired curing (crosslinking) reactions are contemplated as suitable for use in the formulations of the present invention. Non-limiting examples include dialkyl peroxides, diperoxyketals, mono-peroxy carbonates, cyclic ketone peroxides, diacyl peroxides, organosulfonyl peroxides, peroxyesters and solid, room temperature stable peroxydicarbonates. In at least one embodiment, the organic peroxide is selected from dialkyl peroxides, peroxyketals, cyclic ketone peroxides, monoperoxycarbonates, peroxyesters and diacyl peroxides.

Peroxide names and physical properties for all these classes of organic peroxides can be found in "Organic Peroxides" by Jose Sanchez and Terry N. Myers; Kirk- Othmer Encyclopedia of Chemical Technology, Fourth Ed., Volume 18, (1996), the disclosure of which is incorporated herein by reference.

Illustrative dialkyl peroxide initiators include:
di-t-butyl peroxide;
t-butyl cumyl peroxide;
2,5-di(cumylperoxy)-2,5-dimethyl hexane;
2,5-di(cumylperoxy)-2,5-dimethyl hexyne-3;
4-methyl-4-(t-butylperoxy)-2-pentanol;
4-methyl-4-(t-amylperoxy)-2-pentanol;
4-methyl-4-(cumylperoxy)-2-pentanol;
4-methyl-4-(t-butylperoxy)-2-pentanone;
4-methyl-4-(t-amylperoxy)-2-pentanone;
4-methyl-4-(cumylperoxy)-2-pentanone;
2,5-dimethyl-2,5-di(t-butylperoxy)hexane;
2,5-dimethyl-2,5-di(t-amylperoxy)hexane;
2,5-dimethyl-2,5-di(t-butylperoxy)hexyne-3;
2,5-dimethyl-2,5-di(t-amylperoxy)hexyne-3;
2,5-dimethyl-2-t-butylperoxy-5-hydroperoxyhexane;
2,5-dimethyl-2-cumylperoxy-5-hydroperoxy hexane;
2,5-dimethyl-2-t-amylperoxy-5-hydroperoxyhexane;
m/p-alpha, alpha-di[(t-butylperoxy)isopropyl]benzene;
1,3,5-tris(t-butylperoxyisopropyl)benzene;
1,3,5-tris(t-amylperoxyisopropyl)benzene;
1,3,5-tris(cumylperoxyisopropyl)benzene;
di[1,3-dimethyl-3-(t-butylperoxy)butyl]carbonate;
di[1,3-dimethyl-3-(t-amylperoxy)butyl]carbonate;
di[1,3-dimethyl-3-(cumylperoxy)butyl]carbonate;
di-t-amyl peroxide;
dicumyl peroxide;
t-butylperoxy-meta-isopropenyl-cumyl peroxide;
t-amyl cumyl peroxide;
t-butyl-isopropenylcumylperoxide;
2,4,6-tri(butylperoxy)-s-triazine;
1,3,5-tri[1-(t-butylperoxy)-1-methylethyl]benzene
1,3,5-tri-[(t-butylperoxy)-isopropyl]benzene;
1,3-dimethyl-3-(t-butylperoxy)butanol;
1,3-dimethyl-3-(t-amylperoxy)butanol; and mixtures thereof.

Other dialkylperoxides which may be used singly or in combination with the other free radical initiators contemplated by the present disclosure are those selected from the group represented by the formula:

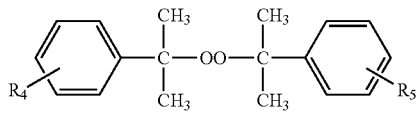

wherein $R_4$ and $R_5$ may independently be in the meta or para positions and are the same or different and are selected from hydrogen or straight or branched chain alkyls of 1 to 6 carbon atoms. Dicumyl peroxide and isopropylcumyl cumyl peroxide are illustrative.

Other dialkyl peroxides include:
3-cumylperoxy-1,3-dimethylbutyl methacrylate;
3-t-butylperoxy-1,3-dimethylbutyl methacrylate;
3-t-amylperoxy-1,3-dimethylbutyl methacrylate;
tri(1,3-dimethyl-3-t-butylperoxy butyloxy)vinyl silane;
1,3-dimethyl-3-(t-butylperoxy)butyl N-[1-{3-(1-methylethenyl)-phenyl}1-methylethyl]carbamate;
1,3-dimethyl-3-(t-amylperoxy)butyl N-[1-{3(1-methylethenyl)-phenyl}-1-methylethyl]carbamate;
1,3-dimethyl-3-(cumylperoxy))butyl N-[1-{3-(1-methylethenyl)-phenyl}-1-methylethyl]carbamate.

In the group of diperoxyketal initiators, the preferred initiators include:
1,1-di(t-butylperoxy)-3,3,5-trimethylcyclohexane;
1,1-di(t-butylperoxy)cyclohexane;
n-butyl 4,4-di(t-amylperoxy)valerate;
ethyl 3,3-di(t-butylperoxy)butyrate;
2,2-di(t-amylperoxy)propane;
3,6,6,9,9-pentamethyl-3-ethoxycabonylmethyl-1,2,4,5-tetraoxacyclononane;
n-butyl-4,4-bis(t-butylperoxy)valerate;
ethyl-3,3-di(t-amylperoxy)butyrate; and mixtures thereof.

Illustrative solid, room temperature stable peroxydicarbonates include, but are not limited to: di(2-phenoxyethyl) peroxydicarbonate; di(4-t-butyl-cyclohexyl)peroxydicarbonate; dimyristyl peroxydicarbonate; dibenzyl peroxydicarbonate; and di(isobornyl)peroxydicarbonate. Other peroxides that may be used according to at least one embodiment of the present disclosure include benzoyl peroxide, OO-t-butyl-O-hydrogen-monoperoxy-succinate and OO-t-amyl-O-hydrogen-monoperoxy-succinate.

Illustrative cyclic ketone peroxides are compounds having the general formulae (I), (II) and/or (III).

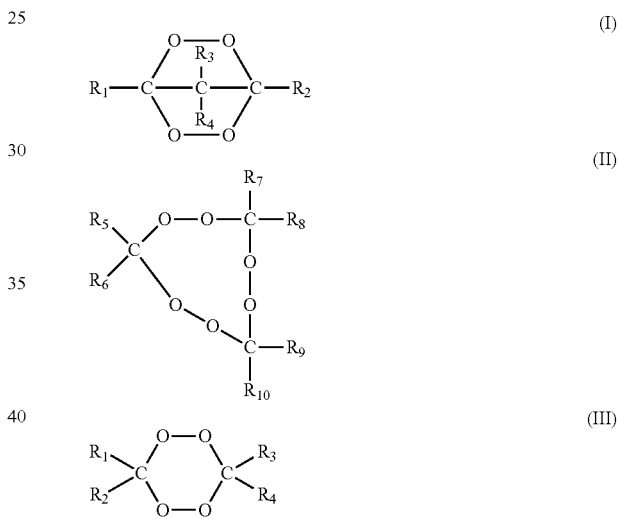

wherein $R_1$ to $R_{10}$ are independently selected from the group consisting of hydrogen, C1 to C20 alkyl, C3 to C20 cycloalkyl, C6 to C20 aryl, C7 to C20 aralkyl and C7 to C20 alkaryl, which groups may include linear or branched alkyl properties and each of $R_1$ to $R_{10}$ may be substituted with one or more groups selected from hydroxy, C1 to C20 alkoxy, linear or branched C1 to C20 alkyl, C6 to C20 aryloxy, halogen, ester, carboxy, nitride and amido, such as, for example, at least 20% of the total active oxygen content of the peroxide mixture used for a crosslinking reaction will be from compounds having formulas (I), (II) and/or (III).

Some examples of suitable cyclic ketone peroxides include:
3,6,9, triethyl-3,6,9-trimethyl-1,4,7-triperoxynonane (or methyl ethyl ketone peroxide cyclic trimer), methyl ethyl ketone peroxide cyclic dimer, and 3,3,6,6,9,9-hexamethyl-1,2,4,5-tetraoxacyclononane.

Illustrative examples of peroxy esters include:
2,5-dimethyl-2,5-di(benzoylperoxy)hexane;
t-butylperbenzoate;
t-butylperoxy acetate;
t-butylperoxy-2-ethyl hexanoate;

t-amyl perbenzoate;
t-amyl peroxy acetate;
t-butyl peroxy isobutyrate;
3-hydroxy-1,1-dimethyl t-butyl peroxy-2-ethyl hexanoate;
OO-t-amyl-O-hydrogen-monoperoxy succinate;
OO-t-butyl-O-hydrogen-monoperoxy succinate;
di-t-butyl diperoxyphthalate;
t-butylperoxy (3,3,5-trimethylhexanoate);
1,4-bis(t-butylperoxycarbo)cyclohexane;
t-butylperoxy-3,5,5-trimethylhexanoate;
t-butyl-peroxy-(cis-3-carboxy)propionate;
allyl 3-methyl-3-t-butylperoxy butyrate.

Illustrative monoperoxy carbonates include:
OO-t-butyl-O-isopropylmonoperoxy carbonate;
OO-t-butyl-O-(2-ethyl hexyl)monoperoxy carbonate;
1,1,1-tris[2-(t-butylperoxy-carbonyloxy)ethoxymethyl]propane;
1,1,1-tris[2-(t-amylperoxy-carbonyloxy)ethoxymethyl]propane;
1,1,1-tris[2-(cumylperoxy-cabonyloxy)ethoxymethyl]propane;
OO-t-amyl-O-isopropylmonoperoxy carbonate.

Illustrative diacyl peroxides include:
di(4-methylbenzoyl)peroxide;
di(3-methylbenzoyl)peroxide;
di(2-methylbenzoyl)peroxide;
didecanoyl peroxide; dilauroyl peroxide;
2,4-dibromo-benzoyl peroxide;
succinic acid peroxide.
dibenzoyl peroxide;
di(2,4-dichloro-benzoyl)peroxide.

Imido peroxides of the type described in PCT Application publication WO9703961 A1 6 Feb. 1997 are also contemplated as suitable for use and incorporated by reference herein.

Preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butylperoxybenzoate; t-butylperoxyacetate; t-butylperoxymaleic acid; di(4-methylbenzoyl)peroxide; dibenzoyl peroxide; di(2,4-dichlorobenzoyl)peroxide; dilauroyl peroxide; cumene hydroperoxide; and di(4-tert-butylcyclohexyl)peroxydicarbonate.

More preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butylperoxybenzoate; dibenzoyl peroxide; di(2,4-dichlorobenzoyl)peroxide; cumene hydroperoxide; and di(4-tert-butylcyclohexyl)peroxydicarbonate.

Even more preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropylcumylperoxide; 3,3,5,7,7-pentamethyl,-1,2,4-trioxepane; m/p-di(t-butylperoxy)diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; t-butylperoxybenzoate; dibenzoyl peroxide; and di(2,4-dichlorobenzoyl)peroxide.

Most preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropylcumylperoxide; m/p-di(t-butylperoxy)diisopropyl benzene; m-di(t-butylperoxy)diisopropyl benzene; p-di(t-butylperoxy)diisopropyl benzene; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; and t-butylperoxybenzoate.

In accordance with particular embodiments, organic peroxide formulations of the present invention may further include at least one coagent and/or at least one filler. Non-limiting examples of co-agents include allyl methacrylate, triallyl cyanurate, triallyl isocyanurate, trimethyloylpropane trimethacrylate (SR-350), trimethyloylpropane triacrylate (SR-351), zinc diacrylate, and zinc dimethacrylate.

Non-limiting examples of optional inert fillers for use in the organic peroxide formulations of the present invention include water washed clay, e.g., Burgess Clay, precipitated silica, precipitated calcium carbonate, synthetic calcium silicate, and combinations thereof. Various combinations of these fillers can be used by one skilled in the art to achieve a free-flowing, non-caking final peroxide formulation.

In accordance with particular embodiments, the organic peroxide formulations of the present invention may include a silica filler.

Organic Peroxide Compositions Comprising Sulfur-Containing Compounds

According to an embodiment of the present invention, an organic peroxide formulation comprises, consists essentially of, or consists of at least one organic peroxide and at least one sulfur-containing compound. The formulation does not include any bis-, tri- or higher poly-maleimides (e.g., N,N'-m-phenylene bismaleimide, also referred to as HVA-2), or bis-, tri- or higher poly-citraconimides. The organic peroxide(s) and sulfur-containing compound(s), and their respective amounts, are preferably selected such that the formulation is capable of curing an elastomer composition in the full or partial presence of oxygen (e.g., using a hot air oven or tunnel, or a steam autoclave). Embodiments of the formulations comprising organic peroxide(s) and sulfur-containing compound(s) are described in Examples 1-4 and 8-12. Examples 9-12 include Vultac-5 formulations of the invention.

Sulfur-containing compounds listed in the "R. T. Vanderbilt Rubber Handbook", 13th Ed. (1990), which is incorporated herein by reference, may be considered for use in the practice of this invention.

Sulfur-containing compounds suitable for use in the present invention include, but are not limited to, organic sulfide compounds, which may be monosulfides, disulfides, trisulfides or higher polysulfides.

The preferred sulfur-containing compounds used in embodiments of the invention are those that contain the general disulfide or trisulfide type structure:

$(R^1-SS-R^2)_x$ or $(R^1-SSS-R^2)_x$, where $R^1$ or $R^2$ may be the same structure or different, and may be saturated or unsaturated; and x=1 and/or x≥2 to include polymeric structures, e.g., the Vultac® disulfides. $R^1$ and $R^2$ may, for example, be aromatic groups such as phenyl groups, which may be substituted, such as with hydroxyl and/or alkyl groups; non-aromatic cyclic groups, such as morpholine groups or caprolactam groups, with sulfur-nitrogen bonds being present; and/or benzothiazyl groups.

Dimeric and polymeric alkylphenol polysulfides (also referred to as poly(alkylphenol)polysulfides) are one type of sulfur-containing compound which may be utilized in the present invention. The alkylphenol may be tert-butyl phenol or tert-amyl phenol, for example Such substances and methods for their synthesis are described in U.S. Pat. Nos. 2,422,156; 3,812,192; 3,968,062; 3,992,362; 6,303,746; 7,294,684; and 8,063,155, each of which is incorporated herein by reference in its entirety for all purposes.

The disulfides and trisulfides may be biobased (e.g., garlic and onion oils) or non-biobased compounds.

Illustrative sulfur-containing compounds include but are not limited to:

Vultac® 5=poly(t-amylphenol disulfide);
Vultac® 7=poly(t-butylphenol disulfide);
Vanax® A=DTDM=4,4-dithiodimorpholine;
Altax®=MBTS=benzothiazyl disulfide also called mercaptobenzothiazole disulfide;
and
CLD-80=N,N'-Caprolactam disulfide.

In one embodiment of the invention, the at least one sulfur-containing compound comprises, consists essentially of or consists of benzothiazyl disulfide. In other embodiments, the at least one sulfur-containing compound comprises, consists essentially of or consists of benzothiazyl disulfide and one or more of a poly(alkylphenol)polysulfide, N,N'-caprolactam disulfide, or 4,4'-dithiomorpholine.

The organic peroxide formulation may, in certain embodiments of the invention, contain elemental sulfur in addition to the sulfur-containing compound(s).

According to one of the particular embodiments, the organic peroxide formulation of the present invention comprises, consists essentially of, or consists of:

at least one organic peroxide (for example, in an amount from 20 wt % to 99 wt %, or from 30 wt % to 90 wt % or from 40 wt % to 75 wt %, or from 40 wt % to 70 wt %, or from 40 wt % to 65 wt %, or from 45 wt % to 80 wt %, or from 45 wt % to 75 wt %, or from 45 wt % to 70 wt %, or from 45 wt % to 65 wt %, or from 50 wt % to 98 wt %, or from 50 wt % to 75 wt %, or from 50 wt % to 70 wt %, or from 50 wt % to 65 wt %, from 50 wt % to 60 wt %, based on the total organic peroxide formulation);

at least one sulfur-containing compound (for example, in an amount from 5 wt % to 50 wt %, or from 10 wt % to 50 wt %, or from 15 wt % to 45 wt %. or from 20 wt % to 70 wt %, or from 20 wt % to 65 wt %, or from 20 wt % to 60 wt %, or from 25 wt % to 70 wt %, or from 25 wt % to 65 wt %, or from 25 wt % to 60 wt %, or from 30 wt % to 70 wt %, or from 30 wt % to 65 wt %, or from 30 wt % to 60 wt %, or from 35 wt % to 70 wt %, or from 35 wt % to 65 wt %, or from 35 wt % to 60 wt %, or from 40 wt % to 70 wt %, or from 40 wt % to 65 wt %, or from 40 wt % to 60 wt %, or from 40 wt % to 55 wt %, or from 40 wt % to 50 wt %, based on the total organic peroxide formulation); and at least one optional inert filler (for example, in an amount from 0.01 wt % to 60.0 wt %; 0.01 wt % to 40 wt %, or from 0.01 wt % to 20 wt %, or from 0.01 wt % to 20 wt %, or from 0.01 wt % to 10 wt %, or from 0.01 wt % to 5 wt %, or from 0.01 wt % to 2 wt %, or from 0.01 wt % to 0.1 wt %, based on the total organic peroxide formulation), wherein the formulation does not include any bis-, tri- or higher poly-maleimides, or bis-, tri- or higher poly-citraconimides, and wherein the at least one peroxide and the at least one sulfur-containing compound, and their respective amounts, are selected such that the formulation is capable of curing an elastomer composition in the full or partial presence of oxygen, and wherein the cured elastomer composition is substantially or completely tack-free.

According to preferred embodiments, compositions of the present invention that include at least one organic peroxide combined with at least one sulfur-containing compound do not include any bis-, tri- or higher poly-maleimides, or bis-, tri- or higher poly-citraconimides, such as HVA-2 (N,N'-m-phenylene dimaleimide).

According to particular embodiments, the at least one sulfur-containing compound is selected from the group consisting of poly(t-amylphenol disulfide); poly(t-butylphenol disulfide); 4,4-dithiodimorpholine; benzothiazyl disulfide; N,N'-caprolactam disulfide; and a combination thereof.

According to further embodiments, the at least one sulfur-containing compound includes benzothiazyl disulfide and at least one additional sulfur-containing compound (e.g., poly (t-amylphenol disulfide); poly(t-butylphenol disulfide); 4,4-dithiodimorpholine; or N,N'-caprolactam disulfide).

An additional embodiment of the present invention provides an elastomer composition comprising, consisting essentially of, or consisting of:

at least one elastomer (either saturated, unsaturated, or both); and
at least one organic peroxide,
and at least one sulfur-containing compound,
wherein the elastomer composition does not include any bis-, tri- or higher poly-maleimides, or bis-, tri- or higher poly-citraconimides, and
wherein the elastomer composition is curable in the full or partial presence of oxygen (e.g., using a hot air oven or tunnel, or a steam autoclave). Preferably, the cured elastomer composition is completely or substantially tack-free.

According to particular embodiments, the elastomer composition comprises, consists essentially of, or consists of at least one elastomer (either saturated, unsaturated, or both); and at least one organic peroxide (on a pure basis) in an amount from 0.1 phr to 20 phr, or from 1 phr to 10 phr, or from 2.0 phr to 7.0 phr (parts per hundred rubber), or from 2.5 phr to 6.5 phr, or from 3.0 phr to 6.0 phr, or from 3.5 phr to 5.5 phr, or from 4.0 phr to 5.0 phr;

at least one sulfur-containing compound in an amount from 0.1 phr to 20 phr, or from 1 phr to 10 phr, or from 2.5 phr to 6.5 phr, or from 2.5 phr to 6.0 phr, or from 2.5 phr to 5.5 phr, or from 3.0 phr to 6.5 phr, or from 3.0 phr to 6.0 phr, or from 3.0 phr to 5.5 phr, or from 3.5 phr to 6.5 phr, or from 3.5 phr to 6.0 phr, or from 3.5 phr to 5.5 phr; and optionally at least one additive selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer, except for bis-, tri- or higher poly-maleimides, or bis-, tri- or higher poly-citraconimides, such as HVA-2). In addition to aliphatic process oils, other oils such as paraffinic, aromatic or more polar or ester type derivatives (e.g., when using HNBR or CPE) may be considered depending upon the type of elastomer chosen. For EPDM, EPM, PE copolymers and blends, the preferred oil is aliphatic.

Non-limiting examples of co-agents that may be used in accordance with any embodiments of the present invention include allyl methacrylate, triallyl cyanurate, triallyl isocyanurate, trimethyloylpropane trimethacrylate (SR-350), trimethyloylpropane triacrylate (SR-351), zinc diacrylate, and zinc dimethacrylate.

According to particular embodiments, the sulfur-containing compound(s) in the organic peroxide formulation include benzothiazyl disulfide (MBTS). For example, the benzothiazyl disulfide may be present in the formulation in an amount that is less than 2.0 phr, or less than 1.75 phr, or less than 1.5 phr, or less than 1.25 phr, or less than 1.0 phr, or less than 0.75 phr, or less than 0.5 phr, or in an amount from 0.01 phr to 2.0 phr, or from 0.01 phr to 1.75 phr, or from 0.01 phr to 1.5 phr, or from 0.01 phr to 1.0 phr, or from 0.01 phr to 0.75 phr, or from 0.01 phr to 0.5 phr, or from 0.1 phr to 2.0 phr, or from 0.1 phr to 1.75 phr, or from 0.1 phr to 1.5 phr, or from 0.1 phr to 1.0 phr, or from 0.1 phr to 0.75 phr, or from 0.1 phr to 0.5 phr, or from 0.2 phr to 2.0 phr, or from 0.2 phr to 1.75 phr, or from 0.2 phr to 1.5 phr, or from 0.2 phr to 1.0 phr, or from 0.2 phr to 0.75 phr, or from 0.2 phr to 0.5 phr.

According to particular embodiments, the sulfur-containing compound(s) in the organic peroxide formulation include benzothiazyl disulfide and at least one additional sulfur-containing compound selected from the group consisting of poly(t-amylphenol disulfide); poly(t-butylphenol disulfide); 4,4-dithiodimorpholine; N,N'-caprolactam disulfide; and a combination thereof, wherein the at least one additional sulfur-containing compound is present in the formulation in an amount from 0.1 phr to 20 phr, or from 1 phr to 10 phr, or from 1.0 phr to 7.0 phr, or from 1.5 phr to 6.5 phr, or from 1.5 phr to 5.5 phr, or from 1.5 phr to 5.0 phr, or from 2.0 phr to 6.0 phr, or from 2.0 phr to 5.5 phr, or from 2.0 phr to 5.0 phr, or from 2.0 phr to 4.5 phr, or from 2.5 phr to 5.0 phr, or from 2.5 phr to 4.5 phr, or from 3.0 phr to 6.0 phr, or from 3.0 phr to 5.5 phr, or from 3.0 phr to 5.0 phr.

According to particular embodiments, an elastomer composition of the present invention comprising, consisting essentially of, or consisting of at least one elastomer (either saturated, unsaturated, or both), at least one organic peroxide and at least one sulfur-containing compound, wherein the elastomer composition does not include any bis-, tri- or higher poly-maleimides, or bis-, tri- or higher poly-citraconimides, which has been cured in the full or partial presence of oxygen, has less surface tackiness in comparison to an elastomer composition that has been cured according to an identical process and that has an identical composition except that it includes one or more bis-, tri- or higher poly-maleimides (e.g., HVA-2), or bis-, tri- or higher poly-citraconimides. Surface tackiness may be judged, for example, by the Facial Tissue Paper Test described herein.

Organic Peroxide Compositions Comprising Organophosphite Compounds

According to an embodiment of the present invention, an organic peroxide formulation comprises, consists essentially of, or consists of at least one organic peroxide and at least one organophosphite compound. The organic peroxide(s) and organophosphite compound(s), and their respective amounts, are preferably selected such that the formulation is capable of curing an elastomer composition in the full or partial presence of oxygen (e.g., using a hot air oven or tunnel, or a steam autoclave). Embodiments of the formulations comprising organic peroxide(s) and organophosphite compound(s) are described in Example 5.

Non-limiting examples of organophosphite compounds that may be used in formulations of the present invention include Irgafos® 168 (tris(2,4-di-tert-butylphenyl) phosphite), TPP (triphenyl phosphite), phenyl didecyl phosphite, di-phenyl isodecyl phosphite, TNPP (tris-nonylphenyl phosphite), and 4,4'-isopropylidene diphenol alkyl (C12-C15) phosphite.

In one embodiment of the invention, the at least one organophosphite compound comprises, consists essentially of, or consists of Irgafos® 168 (tris(2,4-di-tert-butylphenyl) phosphite), TPP (triphenyl phosphite), or a combination thereof.

The ratio of the at least one organophosphite to the at least one organic peroxide is not particularly limited, but may be between about 1:about 0.1 and about 1:about 10. For example, about 1:about 0.7, about 1:about 1, about 1:about 1.5, about 1:about 3, about 1:about 3.6, or about 1:about 7.

According to one embodiment, the organic peroxide formulation of the present invention comprises, consists essentially of, or consists of:

at least one organic peroxide (for example, in an amount from 20 wt % to 99 wt %, or from 30 wt % to 95 wt % or from 40 wt % to 95 wt %, or from 30 wt % to 90 wt %, or from 40 wt % to 90 wt %, or from 45 wt % to 90 wt %, or from 45 wt % to 85 wt %, or from 45 wt % to 80 wt %, or from 45 wt % to 75 wt %, or from 50 wt % to 95 wt %, or from 50 wt % to 90 wt %, or from 50 wt % to 80 wt %, or from 50 wt % to 75 wt %, from 60 wt % to 90 wt %, based on the total organic peroxide formulation);

at least one organophosphite compound (for example, in an amount from 5 wt % to 70 wt %, or 5 wt % to 60 wt %, or from 10 wt % to 60 wt %, or from 15 wt % to 60 wt %. or from 20 wt % to 60 wt %, or from 5 wt % to 50 wt %, or from 10 wt % to 50 wt %, or from 10 wt % to 70 wt %, or from 10 wt % to 40 wt %, based on the total organic peroxide formulation); and at least one optional inert filler (for example, in an amount from 0.01 wt % to 40 wt %, or from 0.01 wt % to 20 wt %, or from 0.01 wt % to 20 wt %, or from 0.01 wt % to 10 wt %, or from 0.01 wt % to 5 wt %, or from 0.01 wt % to 2 wt %, or from 0.01 wt % to 0.1 wt %, based on the total organic peroxide formulation), wherein the at least one peroxide and the at least one organophosphite compound, and their respective amounts, are selected such that the formulation is capable of curing an elastomer composition in the full or partial presence of oxygen, and wherein the cured elastomer composition is substantially or completely tack-free.

An additional embodiment of the present invention provides an elastomer composition comprising, consisting essentially of, or consisting of:
at least one elastomer (either saturated, unsaturated, or both); and
at least one organic peroxide,
and at least one organophosphite compound,
wherein the elastomer composition is curable in the full or partial presence of oxygen (e.g., using a hot air oven or tunnel, or a steam autoclave). Preferably, the cured elastomer composition is completely or substantially tack-free.

According to particular embodiments, the elastomer composition comprises, consists essentially of, or consists of at least one elastomer (either saturated, unsaturated, or both); and
at least one organic peroxide in an amount from 0.1 phr to 20.0 phr, or from 0.1 phr to 15.0 phr, from 0.1 phr to 10.0 phr, or from 1.0 phr to 20 phr, or from 1.0 phr to 15 phr, or from 1.0 phr to 10.0 phr (parts per hundred rubber), or from 2.0 phr to 20.0 phr, or from 2.0 phr to 15.0 phr, or from 2.0 phr to 10.0 phr, or from 3.0 phr to 20.0 phr, or from 3.0 phr to 15.0 phr, or from 3.0 phr to 10.0 phr, or from 4.0 phr to 10.0 phr, or from 5.0 phr to 10.0 phr; and
at least one organophosphite compound (e.g., tris(2,4-di-tert-butylphenyl) phosphite, triphenyl phosphite, or a combination thereof) in an amount from 0.1 phr to 20 phr, or from 0.1 phr to 15 phr, or from 0.1 phr to 10 phr, or from 0.1 phr to 8 phr, from 1 phr to 20 phr, or from 1 phr to 15 phr, or from 1 phr to 10 phr, or from 1 phr to 8 phr, or from 1 phr to 5 phr, or from 2.0 phr to 10.0 phr, or from 2.0 phr to 8.0 phr, or from 2.0 phr to 6.0 phr, or from 3.0 phr to 7.0 phr, or from 3.0 phr to 8.5 phr, or from 3.0 phr to 8.0 phr, or from 3.0 phr to 6.5 phr, or from 3.0 phr to 6.0 phr, or from 3.0 phr to 5.0 phr; and
optionally at least one additive selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer).

According to particular embodiments, an elastomer composition of the present invention comprising, consisting essentially of, or consisting of at least one elastomer (either saturated, unsaturated, or both), at least one organic peroxide and at least one organophosphite compound, which has been cured in the full or partial presence of oxygen, has less surface tackiness in comparison to an elastomer composition that has been cured according to an identical process and that has an identical composition except that it does not include any organophosphite compounds.

Organic Peroxide Compositions Comprising HALS Compounds

According to an embodiment of the present invention, an organic peroxide formulation comprises, consists essentially of, or consists of at least one organic peroxide and at least one HALS (Hindered Amine Light Stabilizer) compound. As used herein, HALS compounds include 2,2,6,6-tetramethyl piperidine and derivatives thereof, wherein the HALS compound may be a single compound, or may be polymeric in nature. The organic peroxide(s) and HALS compound(s), and their respective amounts, are preferably selected such that the formulation is capable of curing an elastomer composition in the full or partial presence of oxygen (e.g., using a hot air oven or tunnel, or a steam autoclave). Embodiments of the formulations comprising organic peroxide(s) and HALS compound(s) are described in Example 6.

Non-limiting examples of HALS compounds that may be used in formulations of the present invention include Chimmasorb® 944 (poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]], a HALS made by BASF); and Tinuvin® 770 ([bis(2,2,6,6-tetramethyl-4-piperidinyl)sebacate], a HALS made by BASF).

In one embodiment of the invention, the at least one HALS compound comprises, consists essentially of, or consists of poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]], bis(2,2,6,6-tetramethyl-4-piperidinyl)sebacate, or a combination thereof.

The ratio of the at least one HALS compound to the at least one organic peroxide is not particularly limited, but may be between about 1:about 0.1 and about 1:about 10; for example, about 1:about 0.7, about 1:about 1, about 1:about 1.5, about 1:about 3, about 1:about 3.6, or about 1:about 7.

According to a particular embodiment, the organic peroxide formulation of the present invention comprises, consists essentially of, or consists of:
at least one organic peroxide (for example, in an amount from 20 wt % to 99 wt %, or from 30 wt % to 95 wt % or from 40 wt % to 95 wt %, or from 30 wt % to 90 wt %, or from 40 wt % to 90 wt %, or from 45 wt % to 90 wt %, or from 45 wt % to 85 wt %, or from 45 wt % to 80 wt %, or from 45 wt % to 75 wt %, or from 50 wt % to 95 wt %, or from 50 wt % to 90 wt %, or from 50 wt % to 80 wt %, or from 50 wt % to 75 wt %, from 60 wt % to 90 wt %, based on the total organic peroxide formulation);
at least one HALS compound (for example, in an amount from 5 wt % to 70 wt %, or 5 wt % to 60 wt %, or from 10 wt % to 60 wt %, or from 15 wt % to 60 wt %. or from 20 wt % to 60 wt %, or from 5 wt % to 50 wt %, or from 10 wt % to 50 wt %, or from 10 wt % to 70 wt %, or from 10 wt % to 40 wt %, based on the total organic peroxide formulation); and
at least one optional inert filler (for example, in an amount from 0.01 wt % to 40 wt %, or from 0.01 wt % to 20 wt %, or from 0.01 wt % to 20 wt %, or from 0.01 wt % to 10 wt %, or from 0.01 wt % to 5 wt %, or from 0.01 wt % to 2 wt %, or from 0.01 wt % to 0.1 wt %, based on the total organic peroxide formulation),
wherein the at least one peroxide and the at least one HALS compound, and their respective amounts, are selected such that the formulation is capable of curing an elastomer composition in the full or partial presence of oxygen, and wherein the cured elastomer composition is substantially or completely tack-free.

An additional embodiment of the present invention provides an elastomer composition comprising, consisting essentially of, or consisting of:
at least one elastomer (either saturated, unsaturated, or both); and
at least one organic peroxide,
and at least one HALS compound, wherein the elastomer composition is curable in the full or partial presence of oxygen (e.g., using a hot air oven or tunnel, or a steam autoclave). Preferably, the cured elastomer composition is completely or substantially tack-free.

According to particular embodiments, the elastomer composition comprises, consists essentially of, or consists of at least one elastomer (either saturated, unsaturated, or both); and at least one organic peroxide in an amount from 0.1 phr to 20.0 phr, or from 0.1 phr to 15.0 phr, from 0.1 phr to 10.0 phr, or from 1.0 phr to 20 phr, or from 1.0 phr to 15 phr, or from 1.0 phr to 10.0 phr (parts per hundred rubber), or from 2.0 phr to 20.0 phr, or from 2.0 phr to 15.0 phr, or from 2.0 phr to 10.0 phr, or from 3.0 phr to 20.0 phr, or from 3.0 phr to 15.0 phr, or from 3.0 phr to 10.0 phr, or from 4.0 phr to 10.0 phr, or from 5.0 phr to 10.0 phr;

at least one HALS compound (e.g., poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]], bis(2,2,6,6-tetramethyl-4-piperidinyl)sebacate, or a combination thereof) in an amount from 0.1 phr to 20 phr, or from 0.1 phr to 15 phr, or from 0.1 phr to 10 phr, or from 0.1 phr to 8 phr, from 1 phr to 20 phr, or from 1 phr to 15 phr, or from 1 phr to 10 phr, or from 1 phr to 8 phr, or from 1 phr to 5 phr, or from 2.0 phr to 10.0 phr, or from 2.0 phr to 8.0 phr, or from 2.0 phr to 6.0 phr, or from 3.0 phr to 7.0 phr, or from 3.0 phr to 8.5 phr, or from 3.0 phr to 8.0 phr, or from 3.0 phr to 6.5 phr, or from 3.0 phr to 6.0 phr, or from 3.0 phr to 5.0 phr; and optionally at least one additive selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer).

According to particular embodiments, an elastomer composition of the present invention comprising, consisting essentially of, or consisting of at least one elastomer (either saturated, unsaturated, or both), at least one organic peroxide, and at least one HALS compound, which has been cured in the full or partial presence of oxygen, has less surface tackiness in comparison to an elastomer composition that has been cured according to an identical process and that has an identical composition except that it does not include any HALS compounds.

Organic Peroxide Compositions Comprising Aliphatic Allyl Urethane Compounds

According to an embodiment of the present invention, an organic peroxide formulation comprises, consists essentially of, or consists of at least one organic peroxide and at least one aliphatic allyl urethane compound. As used herein, an aliphatic allyl urethane compound contains at least one allylic group functionality and at least one urethane group functionality. The organic peroxide(s) and aliphatic allyl urethane compound(s), and their respective amounts, are preferably selected such that the formulation is capable of curing an elastomer composition in the full or partial presence of oxygen (e.g., using a hot air oven or tunnel, or a steam autoclave). Embodiments of the formulations comprising organic peroxide(s) and aliphatic allyl urethane compound(s) are described in Example 7.

An example of an aliphatic allyl urethane compound that may be used in formulations of the present invention includes CN9102®, available from Sartomer.

The ratio of the at least one aliphatic allyl urethane compound to the at least one organic peroxide is not particularly limited, but may be between about 1:about 0.1 and about 1:about 10; for example, about 1:about 0.24, about 1:about 0.40, about 1:about 0.54, about 1:about 0.8, about 1:about 0.9, about 1:about 1, about 1:about 1.8, about 1:about 2.4, about 1:about 3.2, about 1:about 7.2, or about 1:about 9.6.

According to one of the particular embodiments, the organic peroxide formulation of the present invention comprises, consists essentially of, or consists of:

at least one organic peroxide (for example, in an amount from 20 wt % to 99 wt %, or from 30 wt % to 95 wt % or from 40 wt % to 95 wt %, or from 30 wt % to 90 wt %, or from 40 wt % to 90 wt %, or from 45 wt % to 90 wt %, or from 45 wt % to 85 wt %, or from 45 wt % to 80 wt %, or from 45 wt % to 75 wt %, or from 50 wt % to 95 wt %, or from 50 wt % to 90 wt %, or from 50 wt % to 80 wt %, or from 50 wt % to 75 wt %, from 60 wt % to 90 wt %, based on the total organic peroxide formulation);

at least one aliphatic allyl urethane compound (for example, in an amount from 5 wt % to 80 wt %, or 5 wt % to 70 wt %, or 5 wt % to 65 wt %, or from 10 wt % to 80 wt %, or 10 wt % to 70 wt %, or 10 wt % to 65 wt %, or from 15 wt % to 80 wt %, or 15 wt % to 70 wt %, or 15 wt % to 65 wt %, or from 20 wt % to 80 wt %, or 20 wt % to 70 wt %, or 20 wt % to 65 wt %, or from 30 wt % to 80 wt %, or from 30 wt % to 70 wt %, or from 30 wt % to 65 wt %, or from 30 wt % to 60 wt %, based on the total organic peroxide formulation); and at least one optional inert filler (for example, in an amount from 0.01 wt % to 40 wt %, or from 0.01 wt % to 20 wt %, or from 0.01 wt % to 20 wt %, or from 0.01 wt % to 10 wt %, or from 0.01 wt % to 5 wt %, or from 0.01 wt % to 2 wt %, or from 0.01 wt % to 0.1 wt %, based on the total organic peroxide formulation), wherein the at least one peroxide and the at least one aliphatic allyl urethane compound, and their respective amounts, are selected such that the formulation is capable of curing an elastomer composition in the full or partial presence of oxygen, and wherein the cured elastomer composition is substantially or completely tack-free.

An additional embodiment of the present invention provides an elastomer composition comprising, consisting essentially of, or consisting of:

at least one elastomer (either saturated, unsaturated, or both); and at least one organic peroxide, and at least one aliphatic allyl urethane compound, wherein the elastomer composition is curable in the full or partial presence of oxygen (e.g., using a hot air oven or tunnel, or a steam autoclave). Preferably, the cured elastomer composition is completely or substantially tack-free.

According to particular embodiments, the elastomer composition comprises, consists essentially of, or consists of at least one elastomer (either saturated, unsaturated, or both); and at least one organic peroxide in an amount from 0.1 phr to 20.0 phr, or from 0.1 phr to 15.0 phr, from 0.1 phr to 10.0 phr, or from 1.0 phr to 20 phr, or from 1.0 phr to 15 phr, or from 1.0 phr to 10.0 phr (parts per hundred rubber), or from 2.0 phr to 20.0 phr, or from 2.0 phr to 15.0 phr, or from 2.0 phr to 10.0 phr, or from 3.0 phr to 20.0 phr, or from 3.0 phr to 15.0 phr, or from 3.0 phr to 10.0 phr, or from 4.0 phr to 10.0 phr, or from 5.0 phr to 10.0 phr; or from 5.0 phr to 8.0 phr;

at least one aliphatic allyl urethane compound in an amount from 0.1 phr to 20 phr, or from 0.1 phr to 15 phr, or from 0.1 phr to 10 phr, or from 0.1 phr to 8 phr, from 1 phr to 20 phr, or from 1 phr to 15 phr, or from 1 phr to 10 phr, or from 1 phr to 8 phr, or from 1 phr to 5 phr, or from 2.0 phr to 10.0 phr, or from 2.0 phr to 8.0 phr, or from 2.0 phr to 6.0 phr, or from 3.0 phr to 10.0 phr, or from 3.0 phr to 7.0 phr, or from 3.0 phr to 8.5 phr, or from 3.0 phr to 8.0 phr, or from 3.0 phr to 6.5 phr, or from 3.0 phr to 6.0 phr, or from 3.0 phr to 5.0 phr; and optionally at least one additive selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer).

According to particular embodiments, an elastomer composition of the present invention comprising, consisting essentially of, or consisting of at least one elastomer (either saturated, unsaturated, or both), at least one organic peroxide and at least one aliphatic allyl urethane compound, which has been cured in the full or partial presence of oxygen, has less surface tackiness in comparison to an elastomer composition that has been cured according to an identical process and that has an identical composition except that it does not include any aliphatic allyl urethane compounds.

Organic Peroxide Compositions Comprising Nitroxide(s) and Quinone(s)

According to an embodiment of the present invention, an organic peroxide formulation comprises, consists essentially of, or consists of at least one organic peroxide, at least one sulfur-containing compound, at least one nitroxide-containing compound (e.g., 4-hydroxy-TEMPO (4-OHT)) and at least one quinone-containing compound (preferably mono-tert-butylhydroquinone or MTBHQ). The organic peroxide(s), nitroxide-containing compound(s), quinone-containing compound(s), sulfur-containing compound(s), and their respective amounts, are preferably selected such that the formulation is capable of curing an elastomer composition in the full or partial presence of oxygen (e.g., using a hot air oven or tunnel, or a steam autoclave). Embodiments of the formulations comprising organic peroxide(s), nitroxide-containing compound(s), quinone-containing compound(s), and sulfur-containing compound(s) are described in Example 9.

Examples of the nitroxide (or "nitroxide-containing compound") may include derivatives of TEMPO (2,2,6,6-tetramethylpiperidine-1-oxyl), such as 4-hydroxy TEMPO (4-OHT) and 4-acetamido TEMPO. As used herein, the terms "quinone" or "quinone-containing compound" include both quinones and hydroquinones as well as ethers thereof such as monoalkyl, monoaryl, monoaralkyl and bis(hydroxyalkyl) ethers of hydroquinones. Non-limiting examples of quinones that may be used in formulations of the present invention include mono-tert-butylhydroquinone (MTBHQ), hydroquinone, hydroquinone mono-methyl ether (HQMME) (also known as 4-methoxy phenol), mono-t-amylhydroquinone, hydroquinone bis(2-hydroxyethyl) ether, 4-ethoxy phenol, 4-phenoxy phenol, 4-(benzyloxy) phenol, 2,5-bis (morpholinomethyl) hydroquinone, and benzoquinone.

Non-limiting examples of sulfur-containing compound(s) that may be used in combination with the nitroxide(s) and quinone(s) in the organic peroxide formulations include benzothiazyl disulfide, poly(alkylphenol)polysulfide, N,N'-caprolactam disulfide, and 4,4'-dithiomorpholine.

The ratio of nitroxide (e.g., 4-OHT):quinone (e.g., MTBHQ) is not particularly limited, but is preferably about 1:about 1. Other preferred ratios of nitroxide (e.g., 4-OHT): quinone (e.g., MTBHQ) include, but are not limited to, about 1:about 0.5; about 0.5:about 1.0, about 1:about 0.25; and about 0.25:about 1.0.

According to one particular embodiment, the organic peroxide formulation of the present invention comprises, consists essentially of, or consists of:

at least one organic peroxide (for example, in an amount from 20 wt % to 99 wt %, or from 30 wt % to 95 wt % or from 40 wt % to 95 wt %, or from 30 wt % to 90 wt %, or from 40 wt % to 90 wt %, or from 45 wt % to 90 wt %, or from 45 wt % to 85 wt %, or from 45 wt % to 80 wt %, or from 45 wt % to 75 wt %, or from 50 wt % to 95 wt %, or from 50 wt % to 90 wt %, or from 50 wt % to 80 wt %, or from 50 wt % to 75 wt %, from 60 wt % to 90 wt %, based on the total organic peroxide formulation);

at least one nitroxide-containing compound (e.g., 4-OHT) and at least one quinone-containing compound (e.g., MTBHQ); for example, each of the nitroxide-containing compound(s) and the quinone-containing compound(s) may be provided in an amount from 0.01 wt % to 5 wt %, or 0.01 wt % to 2.5 wt %, or from 0.01 wt % to 1 wt %, or from 0.01 wt % to 0.5 wt %. or from 0.01 wt % to 0.25 wt %, or from 0.01 wt % to 0.15 wt %, based on the total organic peroxide formulation), wherein the nitroxide-containing compound(s) (e.g., 4-OHT) and quinone-containing compound(s) (e.g., MTBHQ) are preferably provided in a ratio of about 1:about 1, or alternatively about 1:about 0.5, or about 0.5:about 1.0, or about 1:about 0.25; or about 0.25: about 1.0;

at least one sulfur-containing compound (for example, in an amount from 5 wt % to 50 wt %, or from 10 wt % to 50 wt %, or from 15 wt % to 45 wt %. or from 20 wt % to 70 wt %, or from 20 wt % to 65 wt %, or from 20 wt % to 60 wt %, or from 25 wt % to 70 wt %, or from 25 wt % to 65 wt %, or from 25 wt % to 60 wt %, or from 30 wt % to 70 wt %, or from 30 wt % to 65 wt %, or from 30 wt % to 60 wt %, or from 35 wt % to 70 wt %, or from 35 wt % to 65 wt %, or from 35 wt % to 60 wt %, or from 40 wt % to 70 wt %, or from 40 wt % to 65 wt %, or from 40 wt % to 60 wt %, or from 40 wt % to 55 wt %, or from 40 wt % to 50 wt %, based on the total organic peroxide formulation); and at least one optional inert filler (for example, in an amount from 0.01 wt % to 40 wt %, or from 0.01 wt % to 20 wt %, or from 0.01 wt % to 20 wt %, or from 0.01 wt % to 10 wt %, or from 0.01 wt % to 5 wt %, or from 0.01 wt % to 2 wt %, or from 0.01 wt % to 0.1 wt %, based on the total organic peroxide formulation), wherein the at least one peroxide, 4-OHT, MTBHQ, at least one sulfur-containing compound, and their respective amounts, are selected such that the formulation is capable of curing an elastomer composition in the full or partial presence of oxygen, and wherein the cured elastomer composition is substantially or completely tack-free.

An additional embodiment of the present invention provides an elastomer composition comprising, consisting essentially of, or consisting of:
- at least one elastomer (either saturated, unsaturated, or both),
- at least one organic peroxide,
- at least one nitroxide-containing compound (e.g., 4-OHT),
- at least one quinone-containing compound (e.g., MTBHQ), and
- at least one sulfur-containing compound (e.g., benzothiazyl disulfide, poly(alkylphenol)polysulfide, N,N'-caprolactam disulfide, and/or 4,4'-dithiomorpholine),
- wherein the elastomer composition is curable in the full or partial presence of oxygen (e.g., using a hot air oven or tunnel, or a steam autoclave). Preferably, the cured elastomer composition is completely or substantially tack-free.

According to particular embodiments, the elastomer composition comprises, consists essentially of, or consists of at least one elastomer (either saturated, unsaturated, or both); and
- at least one organic peroxide in an amount from 0.1 phr to 20.0 phr, or from 0.1 phr to 15.0 phr, from 0.1 phr to 10.0 phr, or from 1.0 phr to 20 phr, or from 1.0 phr to 15 phr, or from 1.0 phr to 10.0 phr (parts per hundred rubber), or from 2.0 phr to 20.0 phr, or from 2.0 phr to 15.0 phr, or from 2.0 phr to 10.0 phr, or from 3.0 phr to 20.0 phr, or from 3.0 phr to 15.0 phr, or from 3.0 phr to 10.0 phr, or from 3.0 phr to 8.0 phr, or from 3.0 phr to 6.0 phr, or from 4.0 phr to 10.0 phr, or from 4.0 phr to 8.0 phr, or from 4.0 phr to 6.0 phr;
- at least one nitroxide (e.g., 4-OHT) and at least one quinone (e.g., MTBHQ), each in an amount from 0.01 phr to 5 phr, or from 0.01 phr to 3 phr, or from 0.01 phr to 1 phr, or from 0.01 phr to 0.75 phr, or from 0.1 phr to 3 phr, or from 0.1 phr to 1 phr, or from 0.1 phr to 5 phr;
- at least one sulfur-containing compound in an amount from 0.1 phr to 20 phr, or from 0.1 phr to 10 phr, or from 0.1 phr to 7.5 phr, or from 0.1 phr to 5 phr, or from 0.1 phr to 2.5 phr, or from 1 phr to 20 phr, or from 1 phr to 10 phr, or from 1 phr to 7.5 phr, or from 1 phr to 5 phr, or from 1 phr to 2.5 phr; and
- optionally at least one additive selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer).

Additional Organic Peroxide Compositions

According to additional embodiments of the present invention, one or more of the compounds described herein that are blended with organic peroxide(s) to produce peroxide formulations of the present invention (e.g., sulfur-containing compounds, organophosphite compounds, HALS compounds, aliphatic allyl urethane compounds, nitroxides, and quinones) may be combined together in the same organic peroxide formulation.

In addition to sulfur-containing compounds, organophosphite compounds, HALS compounds, aliphatic allyl urethane compounds, nitroxides, and quinones, additional compounds that may be blended with at least one organic peroxide to produce peroxide formulations of the present invention include drying oils and cellulose compounds.

Drying oils may include oils derived from plant, animal, and fish sources including, for example, glycerol triesters of fatty acids which are characterized by relatively high levels of polyunsaturated fatty acids, especially eleostearic acid and alpha-linolenic acid. According to particular embodiments, the at least one drying oil is selected from the group consisting of: tung oil, hemp oil, biofene or trans-beta-farnesene (made by Amyris), linseed oil, poppy oil, walnut oil, sunflower oil, cottonseed oil, corn oil, soybean oil, sardine oil, herring oil, safflower oil, flax seed oil, perilla oil, and a combination thereof. According to preferred embodiments, the drying oil is tung oil or hemp oil.

Non-limiting examples of cellulose compounds suitable for use in the present invention include cellulose and its derivatives, including cellulose esters, cellulose ethers and combinations thereof; for example, cellulose acetate butyrate (CAB), cellulose acetate proprionate, cellulose acetate, cellulose, micronized cellulose, cellulose gum, microcrystalline cellulose, carboxymethyl cellulose, hydroxypropyl cellulose (HPC), hydroxypropylmethyl cellulose (HMPC), hydroxyethyl cellulose, methyl cellulose, ethyl cellulose, cellulose acetate phthalate, ethyl hydroxyethyl cellulose, hydroxyethyl methyl cellulose, ethyl methyl cellulose, and combinations thereof. According to preferred embodiments, the cellulose compound is cellulose acetate butyrate (CAB).

In accordance with particular embodiments, an organic peroxide formulation comprises, consists essentially of, or consists of at least one organic peroxide and one or more compounds selected from the group consisting of: sulfur-containing compounds, organophosphite compounds, HALS compounds, aliphatic allyl urethane compounds, nitroxide-containing compounds (e.g., 4-OHT), quinone-containing compounds (e.g., MTBHQ), drying oils, cellulose compounds and a combination thereof. Optional additive(s) that may be included in the formulation are selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer). The components of the formulation and their respective amounts, are selected such that the formulation is capable of curing an elastomer composition in the full or partial presence of oxygen (e.g., using a hot air oven or tunnel, or a steam autoclave).

According to another embodiment, an organic peroxide formulation comprises, consists essentially of, or consists of at least one organic peroxide, at least one sulfur-containing compound, optionally at least one nitroxide-containing compound, optionally at least one quinone-containing compound, and one or more compounds selected from the group consisting of: organophosphite compounds, HALS compounds, aliphatic allyl urethane compounds, drying oils, cellulose compounds and a combination thereof. Optional additive(s) that may be included in the formulation are selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer). According to certain embodiments, the formulation does not include any bis-, tri- or higher poly-maleimides, or bis-, tri- or higher poly-citraconimides type coagents. The components of the formulation and their respective amounts, are selected such that the formulation is capable of curing an elastomer composition in the full or partial presence of oxygen (e.g., using a hot air oven or tunnel, or a steam autoclave).

According to another embodiment, an organic peroxide formulation comprises, consists essentially of, or consists of at least one organic peroxide, at least one nitroxide-containing compound (e.g., 4-OHT), at least one quinone-containing compound (e.g., MTBHQ), and one or more compounds selected from the group consisting of: sulfur-containing compounds, organophosphite compounds, HALS compounds, aliphatic allyl urethane compounds, drying oils, cellulose compounds and a combination thereof. Optional additive(s) that may be included in the formulation are selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer). The components of the formulations and their respective amounts, are selected such that the formulation is capable of curing an elastomer composition in the full or partial presence of oxygen (e.g., using a hot air oven or tunnel, or a steam autoclave).

According to another embodiment, an elastomer composition comprises, consists essentially of, or consists of at least one elastomer, at least one peroxide, and one or more compounds selected from the group consisting of: sulfur-containing compounds, organophosphite compounds, HALS compounds, aliphatic allyl urethane compounds, nitroxide-containing compounds (e.g., 4-OHT), quinone-containing compounds (e.g., MTBHQ), drying oils, cellulose compounds and a combination thereof, wherein the elastomer composition is curable in the full or partial presence of oxygen.

According to another embodiment, an elastomer composition comprises, consists essentially of, or consists of at least one elastomer, at least one organic peroxide, at least one sulfur-containing compound, optionally at least one nitroxide-containing compound, optionally at least one quinone-containing compound, and one or more compounds selected from the group consisting of: organophosphite compounds, HALS compounds, aliphatic allyl urethane compounds, drying oils, cellulose compounds and a combination thereof, wherein the elastomer composition is curable in the full or partial presence of oxygen.

According to another embodiment, an elastomer composition comprises, consists essentially of, or consists of at least one elastomer, at least one peroxide, at least one nitroxide-containing compound (e.g., 4-OHT), at least one quinone-containing compound (e.g., MTBHQ), and one or more compounds selected from the group consisting of: sulfur-containing compounds, organophosphite compounds, HALS compounds, aliphatic allyl urethane compounds, drying oils, cellulose compounds and a combination thereof, wherein the elastomer composition is curable in the full or partial presence of oxygen.

Elastomers Suitable for Use in Embodiments of the Present Invention

In at least one embodiment, the elastomer compositions of the present invention may comprise a saturated elastomer, an unsaturated elastomer, or a blend of both a saturated and unsaturated elastomer.

According to particular embodiments, the elastomer compositions of the present invention further comprise at least one polymer. The at least one polymer of the elastomer composition may comprise a saturated polymer, an unsaturated polymer, or both a saturated and unsaturated polymer.

It should be noted that commercially-available pre-compounded elastomers may be used in accordance with the present invention. These elastomers may contain additives such as carbon black filler, process oils, mold release agents, antioxidants and/or heat stabilizers. According to particular embodiments, the at least one elastomer is part of an elastomer masterbatch that includes one or more of these additives. For example, an elastomer masterbatch may comprise, consist essentially of, or consist of the at least one elastomer and one or more additives selected from the group consisting of carbon black, polyethylene glycol, at least one process oil (e.g., liquid saturated hydrocarbons, such as Primol® 352), at least one antioxidant (e.g., 2,2,4-trimethyl-1,2-dihydroquinoline, CAS #26780-96-1 also referred to as Stanguard® TMQ Powder), at least one mold release agent, at least one heat stabilizer, and a combination thereof.

As used herein, the term "polymer" means a non-elastomeric polymer comprised of at least at least one monomer in polymerized form. The term "polymer" encompasses homopolymers and copolymers, where the term "copolymers" refers to a polymer comprised of at least two different monomers in polymerized form. For example, a copolymer in accordance with the present disclosure may be a polymer comprising two different monomers, a terpolymer is a polymer comprising three different monomers or more.

In at least one embodiment, the polymer of the elastomer composition comprises a copolymer. The embodiments disclosed herein recite elastomer compositions comprising a copolymer. However, as one of ordinary skill in the art would readily appreciate, a homopolymer may be substituted in any embodiment comprising a copolymer, unless expressly indicated to the contrary.

In at least one embodiment, the elastomer composition comprises at least one elastomer and at least one copolymer. The elastomer and copolymer may be present in the elastomer composition at weight ratios ranging from 99:1 to 1:99, such as, for example, from 85:15 to 15:85, or from 75:25 to 25:75. In at least one embodiment, the elastomer and copolymer are present in the elastomer composition in a 50:50 weight ratio. In another embodiment, the elastomer composition includes 100% elastomer(s) and no copolymer(s).

According to at least one embodiment, the elastomer composition comprises at least one saturated elastomer. The saturated elastomer can be selected from, for example, silicon rubber without unsaturation (Q), methyl-polysiloxane (MQ), phenyl-methyl-polysiloxane (PMQ), poly(ethylene-vinyl acetate) (EVA), high-density polyethylene (HDPE), low-density polyethylene (LDPE), chlorinated poly(ethylene) (CM or CPE), poly(ethylene-propylene) (EPM), fluoroelastomers (FKM, FFKM) (e.g., Viton® and Dyneon®), and combinations thereof.

According to at least one embodiment, the elastomer composition comprises at least one unsaturated elastomer. Unsaturated elastomers that may be used in the elastomer composition include, for example, ethylene-propylene-diene terpolymer (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloropropene, bromobutyl rubber (BIIR), chlorobutyl rubber, and combinations thereof.

According to particular embodiments, the elastomers of the present invention do not include fluorine-containing elastomers, and do not include elastomers that contain iodine or bromine.

In accordance with at least one embodiment, the elastomer composition comprises at least one saturated copolymer. Non-limiting examples of saturated polymers that may be used include copolymers of ethylene with propylene, butylene, pentene, hexene, heptene, octene, and vinyl acetate, such as, linear low density polyethylene (LLDPE), low density polyethylene (LDPE), high density polyethylene (HDPE), poly(ethylene-vinyl acetate) (EVA), poly(ethylene-propylene) (EPM), poly(ethylene-α-olefins) poly(ethylene-octene) (e.g., Engage®), poly(ethylene-hexene), poly(ethylene butylene) (e.g., Tafmer®), poly(ethylene-heptene), Vamac® polymers (e.g., poly(ethylene methyl acrylate), poly(ethylene acrylate), and combinations with acrylic acid), and combinations thereof.

Additional non-limiting examples of elastomers and polymers suitable for use in the current invention include polyurethane (AU and EU), vinylidene fluoride copolymers (CFM), silicone rubber, chlorosulfonated polyethylene (CSM), 5-vinyl-2-norbornene-EPDM (e.g. Keltan® ACE EPDM), and polysulfide rubber.

When a foamed product is desired, the elastomer composition may comprise a blowing agent.

According to particular embodiments, the elastomer compositions and organic peroxide formulations of the present invention do not include any organosiloxane gums, such as those described in U.S. Pat. No. 4,376,184. According to further embodiments, the elastomer compositions and organic peroxide formulations of the present invention do not include any polymer additives having a low molecular weight between 1,000 and 15,000, such as those described in EP 0246745. According to further embodiments, the elastomer compositions and organic peroxide formulations of the present invention do not include any zinc oxide.

Embodiments of Methods of the Present Invention

At least one embodiment of the present invention relates to a method for manufacturing an article comprising an elastomer composition as described herein, wherein the method comprises curing the elastomer composition in the full or partial presence of oxygen (e.g., using a hot air oven or tunnel, or a steam autoclave).

As used herein, the term "curing" refers to the crosslinking of a polymer to form a strengthened or hardened polymer. A curing step may be performed in any conventional manner, such as, for example, hot air, steam, or hot molding.

The method may comprise extruding an elastomer composition, as described herein, to form an uncured preform article, and curing the uncured preform article. The elastomer composition may be extruded in the presence of hot air to form the uncured preform. In at least one embodiment, the preform is cured using microwaves or a steam autoclave. In at least one other embodiment, the preform is cured without using microwaves or a steam autoclave.

In at least one embodiment, the extruded profile is heated in a microwave zone in the presence of air directly from the extruder, then passed through a longer heated air tunnel to complete the cure of the elastomeric profile.

The method for manufacturing the article may be performed in a hot air tunnel, or any other known apparatus.

In at least one embodiment, the method for manufacturing the article can be formed continuously. Continuous manufacturing may allow for the production of a continuous article, such as a continuous seal, as opposed to seals that must be pieced together from smaller parts.

At least one embodiment of the present disclosure relates to a method for manufacturing hose. The method may comprise extruding a length of hose from an elastomer composition without curing the length of hose. The length of uncured hose may be collected and then cured, such as by exposing the uncured hose to steam.

At least one embodiment of the present invention relates to a process for curing an elastomer composition, the process comprising curing the elastomer composition in the presence of oxygen, wherein the composition comprises, consists essentially of, or consists of:
- at least one elastomer,
- at least one organic peroxide, and
- at least one sulfur-containing compound, wherein the elastomer composition does not include any bis-, tri- or higher poly-maleimides, or bis-, tri- or higher poly-citraconimides. The process may further comprise mixing the at least one elastomer, the organic peroxide(s), and the sulfur-containing compound(s), separately or together, and in any order, to provide the elastomer composition.

At least one embodiment of the present invention relates to a process for curing an elastomer composition, the process comprising curing the elastomer composition in the presence of oxygen, wherein the mixture comprises, consists essentially of, or consists of:
- at least one elastomer,
- at least one organic peroxide, and
- at least one organophosphite compound. The process may further comprise mixing the at least one elastomer, the organic peroxide(s), and the organophosphite compound(s), separately or together, and in any order, to provide the elastomer composition.

At least one embodiment of the present invention relates to a process for curing an elastomer composition, the process comprising curing the elastomer composition in the presence of oxygen, wherein the mixture comprises, consists essentially of, or consists of:
- at least one elastomer,
- at least one organic peroxide, and
- at least one HALS compound. The process may further comprise mixing the at least one elastomer, the organic peroxide(s), and the HALS compound(s), separately or together, and in any order, to provide the elastomer composition.

At least one embodiment of the present invention relates to a process for curing an elastomer composition, the process comprising curing the elastomer composition in the presence of oxygen, wherein the mixture comprises, consists essentially of, or consists of:
- at least one elastomer,
- at least one organic peroxide, and
- at least one aliphatic allyl urethane compound. The process may further comprise mixing the at least one elastomer, the organic peroxide(s), and the aliphatic allyl urethane compound(s), separately or together, and in any order, to provide the elastomer composition.

At least one embodiment of the present invention relates to a process for curing an elastomer composition, the process comprising curing the elastomer composition in the presence of oxygen, wherein the mixture comprises, consists essentially of, or consists of:
- at least one elastomer,
- at least one organic peroxide, at least one nitroxide-containing compound (e.g., 4-OHT), at least one quinone-containing compound (e.g., MBTHQ), and at least one sulfur-containing compound. The process may further comprise mixing the at least one elastomer, the organic peroxide(s), the nitroxide-containing compound(s), the quinone-containing compound(s), and the sulfur-containing compound(s) separately or together, and in any order, to provide the elastomer composition.

At least one embodiment of the present invention relates to a process for curing an elastomer composition, the process comprising curing the elastomer composition in the presence of oxygen, wherein the mixture comprises, consists essentially of, or consists of:

at least one elastomer, at least one organic peroxide, at least one optional sulfur-containing compound, at least one optional nitroxide-containing compound (e.g., 4-OHT), at least one optional quinone-containing compound (e.g., MBTHQ), and one or more compounds selected from the group consisting of: organophosphite compounds, HALS compounds, aliphatic allyl urethane compounds, drying oils, cellulose compounds and a combination thereof. The process may further comprise mixing the components separately or together, and in any order, to provide the elastomer composition.

In at least one embodiment, one or more conventional additives such as antioxidants (e.g., hindered phenols and polymeric quinoline derivatives), aliphatic process oils, process aids, pigments, dyes, tackifiers, waxes, reinforcing aids, UV stabilization agents, blowing agents, scorch protectors, activators, antiozonants or coagents may also be added to any of the elastomer compositions described herein before, after and/or during the curing step.

Embodiments of Elastomeric Articles of the Present Invention

Embodiments of the present invention also provide an elastomeric article comprising a cured elastomer composition as described herein. Preferably, the elastomeric article is completely or substantially tack-free.

According to particular embodiments, the elastomeric article is a non-coating type (i.e., not a liquid coating).

Embodiments of the present invention may also include the process of dissolving high molecular weight solid polymers in a solvent, then removing the solvent to create a solid elastomer structure which is then hot air cured in a separate step (e.g., to provide a means to impregnate textiles). One example of this commercial use is the production of automotive air bags. Additional examples include cured-in-place solid elastomer automotive and truck head gaskets, in which case a liquid solution of solvent and a high molecular weight polymer, or blends of polymers, along with curatives, is applied to a metal surface. The solvent is removed, leaving a solid high molecular weight polymer of complex structure on the metal part. This solid rubber gasket on the metal part can then be heated to crosslink the polymer. In each case, the solvent must be substantially or preferably completely removed from the solid polymer or elastomer; once the solid elastomer is free of solvent, the part can then be cured by applying heat to begin the crosslinking reaction. This is in contrast to paints, coatings and varnishes, wherein the cure process is concurrent with the solvent removal.

In at least one embodiment, an article of the present invention may comprise a seal, hose, or gasket. Exemplary elastomeric articles that may be made in accordance with the compositions and methods of the present invention include O-rings, gaskets, diaphragms, seals, grommets, electrical insulators, shoe soles, septums, fittings, shrouds, sheets, belts, tubes, etc. The present disclosure also relates to automotive, industrial, or residential seals manufactured according to the compositions and methods disclosed herein.

An additional benefit of the present invention is that mold-fouling is reduced during the manufacture of elastomer articles. In prior methods, oxygen present in a mold would prevent the complete reaction of the elastomer, which resulted in a residue of uncured elastomer that would build up in the mold. This build-up needed to be cleaned out periodically.

According to additional embodiments, a method for reducing mold-fouling in the presence of oxygen comprises supplying an uncured elastomer composition to a mold, wherein the uncured elastomer composition comprises, consists essentially of, or consists of at least one elastomer (either saturated, unsaturated, or both) and an organic peroxide formulation as described herein.

The embodiments described herein are intended to be exemplary of the invention and not limitations thereof. One skilled in the art will appreciate that modifications to the embodiments and examples of the present disclosure may be made without departing the scope of the present disclosure. The embodiments of the invention are described above using the term "comprising" and variations thereof. However, it is the intent of the inventors that the term "comprising" may be substituted in any of the embodiments described herein with "consisting of" and "consisting essentially of" without departing the scope of the invention.

The following examples further illustrate the best mode contemplated by the inventors for the practice of their invention and are to be construed as illustrative and not in limitation thereof.

ABBREVIATIONS USED FOR THE RPA RHEOMETER TEST

ML (dN-m) is the minimum torque in deci-Newton-meters in a RPA rheometer test and relates to the viscosity of the elastomer compostion at the test temperature.

MH (dN-m) is the maximum torque in deci-Newton-meters in a RPA rheometer test and relates to the maximum amount of crosslinking attained.

MH−ML (dN-m) is the relative degree of crosslinking in deci-Newton-meters

Ts1 (min) is the time to attain a 1 dN-m increase from the minimum torque in minutes Ts2 (min) is the time to attain a 2 dN-m increase from the minimum torque in minutes Tc50 (min) is the time to attain 50% of the MH−ML (dN-m) cure state in minutes from the minimum torque.

Tc90 (min) is the time to attain 90% of the MH−ML (dN-m) cure state in minutes, from the minimum torque.

ABBREVIATIONS USED IN THE EXAMPLES

Chimmasorb® 944 is poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]], a HALS available from BASF.

CLD-80 is N,N'-Caprolactam disulfide (80%); Rhenogran® CLD-80 available from Rhein Chemie.

CN9102® is an aliphatic allyl urethane available from Sartomer.

DTDM is 4,4'-dithiodimorpholine.

EVA is poly(ethylene vinyl acetate).

Evatane® 3345 is poly(ethylene vinyl acetate), 33 wt % vinyl acetate and 45 MFI available from Arkema.

HVA-2 is N,N'-m-phenylene dimaleimide (coagent) available from DuPont®.

4-Hydroxy TEMPO or 4-OHT is 4-hydroxy-2,2,6,6-tetramethylpiperidin-1-oxyl.

Irgafos® 168 is tris(2,4-di-tert-butylphenyl) phosphite, CAS #31570-04-4, available from BASF.

Kleenex® is facial tissue available from Kimberly-Clark.

Luperox® 101 is 2,5-dimethyl-2,5-di(t-butylperoxy)hexane (93% to 95% peroxide content) available from Arkema.

Luperox® 101XL45 is 2,5-dimethyl-2,5-di(t-butylperoxy)hexane (45%-48% peroxide content) available from Arkema on inert filler.

Luperox® 231XL40 is 3,3,5-trimethyl-1,1-di(t-butylperoxy)cyclohexane (40% peroxide content) available from Arkema.

Luperox® F40KEP is m/p—di(t-butylperoxy)diisopropyl benzene (40% peroxide content) available from Arkema.

Luperox® F90P is m/p—di(t-butylperoxy)diisopropyl benzene (90% peroxide content) available from Arkema.

Luperox® TBEC is t-butyl-2-ethylhexyl)monoperoxycarbonate.

MBT is mercaptobenzothiazole.

MBTS is benzothiazyl disulfide, also called mercaptobenzothiazole disulfide, also called Altax® from R. T. Vanderbilt.

MTBHQ is mono-tertiary butyl hydroquinone, CAS 1948-33-0.

Naugard® 445 is 4,4'-bis(α,-dimethylbenzyl)diphenylamine, an antioxidant from Chemtura.

PEG is Poly(ethylene glycol).

phr means parts of ingredient added for every 100 parts of rubber in the formulation.

Primol® 352 is a white oil (100% non-aromatic) from ExxonMobil.

Poly(ethylene α-olefin) is a Poly(ethylene octene) copolymer from Dow marketed as Engage®

SR-350 or TMPTMA is a crosslinking coagent; or trimethylolpropane trimethacrylate from Sartomer Arkema.

SR-351 is a crosslinking coagent; trimethylolpropane triacrylate from Sartomer Arkema.

Sunpar® 2280 is a paraffinic type process oil from Sunoco.

Tinuvin® 770 is bis(2,2,6,6-tetramethyl-4-piperidinyl)sebacate, a HALS available from BASF.

TMTD is tetramethylthiuram disulfide.

TAC is triallyl cyanurate a crosslinking coagent from Evonik.

TAIC is triallyl isocyanurate a crosslinking coagent from Mitsubishi Intl.

TMPTMA is a crosslinking coagent; Sartomer SR-350; or trimethylolpropane trimethacrylate from Sartomer Arkema.

TMQ or Stanguard® TMQ Powder is 2,2,4-trimethyl-1,2-dihydroquinoline, CAS #26780-96-1 from Harwick Standard Distribution Corporation.

TPP is triphenyl phosphite, CAS 101-02-0.

Vamac® DP, is a peroxide curable poly(ethylene acrylic) elastomer from formerly DuPont, now called Chemours Vanfre® VAM is Polyoxyethylene octadecyl ether phosphate a recommended processing aid for the elastomer, VAMAC® DP an ethylene/acrylic copolymer, Vanfre® VAM is available from R. T. Vanderbilt.

Vultac® 5 is t-amyl phenol disulfide polymer, an arylpolysulfide polymer/oligomer also referred to as a poly (t-amylphenol disulfide); available from Arkema.

Vultac® 7 is t-butyl phenol disulfide polymer, an arylpolysulfide polymer/oligomer available from Arkema.

Tests and Procedures

Procedure for Mixing Rubber and Rubber Sheet Preparation

The following procedure was used for mixing rubber and preparing the rubber sheet for hot air curing. A Brabender Plasti-Corder® with a 50 ml capacity bowl that is jacketed with the ability to run room temperature or heated oil was used. The mixer was equipped with removable sigma type blades. Using the specific gravity provided with the pre-compounded elastomer, small strips of rubber were slowly added to the bowl at a mixing speed of 20 to 25 rpm. The total amount of rubber added to the Brabender Plasti-Corder® bowl was equivalent to the weight needed to provide 48 ml of rubber volume so that there was sufficient volume to add the peroxide curatives to the rubber, as the mixer has a ~50 ml volume capacity.

Out of this 48 ml of rubber, two small strips of rubber (equivalent to about 4 grams or no more than 5 ml) were held in reserve. All the rest of the rubber was slowly added to the bowl. Once all the rubber was added to the mixer and the rubber was flowing in the bowl, the mixer rpm was reduced to 15 rpm and the peroxide formulation for that experiment, which was pre-weighed in small Dixie® cups on a minimum of a three place balance for good accuracy, was slowly added to the mixing rubber. To make sure all of the residual peroxide was included in the mixing rubber, the two small reserve rubber strips were used to wipe the powder off the V-shaped metal portion of the mixer. This powder adhered to the rubber strip and the remaining two strips of rubber were introduced into the mixer.

The rpm was then increased back to 25 rpm for three minutes. After this time, the mixer speed was lowered to 10 rpm and the mixer head was unbolted and removed. Once the blades were no longer turning, the rubber around the blades was safely removed and placed on a sheet of Mylar® polyester. There was a small amount of rubber that was located at the head of the mixer blades within the inner hollow portion of the mixing chamber, which was removed last. The mixer head was re-assembled with the bolts and the mixer motor was started again at 20 rpm. The rubber which was removed last, which was trapped in the mixing chamber, was added first to the spinning blades, followed by the rubber that was taken off the blades. This provided for a more uniform mixing of elastomer. The rpm was then increased to 25 rpm and held there for 3 minutes. After this time, the mixer speed was set to 10 rpm and the mixer head unbolted and removed. Once removed, the mixer blade motion stopped and it was again safe to remove all of the rubber from the mixer's bowl and blades.

The warm rubber was then formed into a tight ball and placed between two Mylar® polyester sheets. This sandwich was placed in a warmed hydraulic powered Carver press where the press may be set to between room temperature and 60° C., depending upon the elastomer and the peroxide curatives being used. The ball of rubber was pressed flat between the two heavy Mylar® polyester sheets. Wearing nitrile gloves, the press was opened and the Mylar® polyester sheet sandwich containing the flattened rubber was removed. The top sheet was removed and the rubber was rolled into a tube. This was re-sandwiched and flattened again. The sheet was rolled again, but 90 degrees to the original roll direction, and flattened again. This was repeated a third time, and care was taken to flatten to an approximate thickness of ⅛ inch. The sandwich was placed on the bench top and covered with a metal sheet where the rubber was allowed to cool. It was then removed and stored in a tightly-sealed polyethylene bag. These sheets were then cut with scissors or using a sharp metal circle punch, to make small flat circle sheets of uncured rubber for the Rheometer cure evaluation, and square flat sheets for the hot air oven testing using the "Facial Tissue Paper Test" described below.

Facial Tissue Paper Test

The following procedure was used to test the surface tack of the rubber sheet after curing in a hot air oven. This procedure is also referred to as a "Facial Tissue Paper Test" for surface tackiness of a rubber sheet cured in a hot air oven.

A flat sheet of uncured rubber was prepared with dimensions of ⅛" thick by 2" wide and 3" long, and was hung carefully in a pre-heated hot air oven set to 205° C. for 15 minutes. The sheet was hung in the oven by metal clamps from a metal rack to expose all sides of the sheet to the hot air. After 15 minutes of cure, the rubber sheet was promptly removed and placed on an aluminum foil-covered piece of cardboard. It was covered immediately with a Kleenex® Facial Tissue and very firm pressure was immediately applied by hand to the entire rubber surface, followed by applying a 1800 gram weight for five minutes. After the rubber cooled to room temperature, the soft facial tissue paper was carefully removed to examine the rubber surface for any tissue paper fibers that may have adhered to the surface. If a great many tissue paper fibers adhere, this indicates a poor surface cure, or one that has a high amount of surface tackiness.

As used herein, the Surface Tackiness Number=(% of surface with no paper fibers÷10). The Surface Tackiness number can range from 10 to 0. A completely tack-free cured rubber surface with no tissue paper fibers has a rating of 10. A very poorly cured rubber surface that is completely covered in tissue paper fibers is rated a 0. If 90% of the surface has no tissue paper fibers attached, the rating is a 9, if 70% of the surface has no tissue paper fibers attached, the rating is a 7, etc.

Rheometer Procedures

The following procedure was used for moving die rheometer and RPA (Rubber Process Analzer) evaluations. For the Alpha Technologies MDR rheometer, test method ASTM D5289-12 "Standard Test Method for Rubber Property—Vulcanization Using Rotorless Cure Meters" was used. Test method ASTM D6204 was used with either a 0.5 degree or 1.0 degree arc and 100 cpm frequency of oscillation at cure temperatures appropriate for the curative system, e.g., 185° C. for the examples below.

When conducting rheometer evaluations, approximately 5 to 6 grams of elastomer (depending upon the density of the final compound) were used to completely fill the upper and lower dies of the rheometer. The uncured rubber was cut from the pressed sheet formed by the procedure described above. The rubber was cut into small round discs about 1.25 inches in diameter and placed between two Dartek® sheets. This sandwich was then placed in the rheometer for testing following ASTM D5289.

Following ASTM D6601 for after cure dynamic testing, a test with the RPA using the stress relaxation feature of the instrument with a 3 degree arc applied strain was applied to gauge the crosslinked elastomer's ability to serve as a gasket or seal. This purpose was very similar to the percent compression test following standard NF ISO 815. The loss of the elastic modulus or S' (dN-m) is followed versus time, for several minutes. The rate in loss of elastic modulus reflects the percent compression set performance. The lowest percent compression values for cured rubber samples will have the lowest loss in the elastic modulus or S' (dN-m) over a one minute period at a test temperature of 185° C. or higher.

% Compression Set Procedures

The following procedures were used for compression set evaluations. The standardized test methods for % compression set were NF ISO 815 and/or ASTM D395, which are suitable for Ambient and High Temperature application testing. Specifically, in Example 1, NF ISO 815 was used, wherein samples for the test were first cured at 190° C. to form a cylinder of 6.3±0.3 mm height and 13±0.5 mm diameter using a curing time of Tc90+8 minutes, then test pieces were placed in the NF ISO 815 device to compress 25% at 150° C. for 24 hours. After this time, samples were released and placed on a wooden board at ambient temperature for 30 minutes before being measured for change in height.

Tensile Testing Procedures

The following procedures were used for tensile testing. Tensile properties were determined by following the standard NF ISO 37 and/or ASTM D412. First, sheets of 1.5 mm thick were cured under pressure in a pneumatic press. The conditions of curing were determined from the Tc90 (minute) 90% of cure time result for the compound when tested on the MDR or RPA rheometer at 190° C. The curing temperature was 190° C. and the curing time was Tc90+8 minutes. Then, dumbbells were cut from the 1.5 mm cured sheet using the appropriate die designated by NF ISO 37 and/or ASTM D412. Finally, tensile tests were performed on the dumbbells using an INSTRON® 5565 tensile machine. A speed of 200 mm/min was used.

EXAMPLES

Example 1

In this example, the EDPM Masterbatch elastomer formulation in Table 1 and the sulfur vulcanization "control" formulation in Table 2 were prepared. Table 3 provides a summary of five sample runs, which tested various cure systems in the EPDM masterbatch formulation.

TABLE 1

"EPDM MB" Masterbatch Formulation

| Ingredient | Phr |
|---|---|
| Vistalon ® 2504 EPDM | 100.0 |
| N550 Carbon Black | 100.0 |
| Primol ® 352 white process oil | 40.0 |
| PEG Polyethylene glycol | 3.0 |
| Stanguard ® TMQ Powder (antioxidant) | 1.0 |
| Total weight of the masterbatch | 244.0 |

TABLE 2

Sulfur Vulcanization Control Formulation used to Cure "EPDM MB" found in TABLE 1

| Masterbatch Ingredient | Parts |
|---|---|
| "EPDM MB" | 244.0 |
| "Sulfur Control" Ingredients | PHR (Parts Per 100 Rubber) |
| Zinc Oxide | 5.00 |
| Stearic Acid | 1.00 |
| Sulfur (80%) | 3.10 |
| MBTS (75%) | 2.20 |
| MBT (80%) | 1.64 |
| TMTD (80%) | 0.31 |
| Total Sulfur Control= | 13.25 |

NOTE:
244 PARTS OF "EPDM MB" CONTAINS 100 PARTS OF RUBBER

TABLE 3

Sulfur and Peroxide Formulation Testing of TABLE 1 EPDM Masterbatch

| | Sample # | | | | |
|---|---|---|---|---|---|
| | 1 | 2 | 3 | 4 | 5 |
| Parts of "EPDM MB" from Table 1 | 244 | 244 | 244 | 244 | 244 |
| phr "Sulfur Control" from Table 2 | 13.25 | — | — | — | — |
| phr HVA-2 ® | — | — | 2.0 | — | — |
| phr Luperox ® F40KE | — | 8.0 | — | — | — |
| phr Luperox ® F90P | — | — | 4.0 | 5.28 | 4.0 |
| phr Vultac ® 5 | — | — | 1.6 | 2.16 | 3.6 |
| phr MBTS | — | — | 0.4 | 0.56 | 0.4 |
| phr Total Curative | 13.25 | 8.0 | 8.0 | 8.0 | 8.0 |
| Moving Die Rheometer at 180° C., 1.677 Hz (100 cpm), 0.5° arc | | | | | |
| Crosslink Density (MH − ML) in dN-m | 27.5 | 27.5 | 21.25 | 28.0 | 22.5 |
| Hot Air Cure at 205° C. for 15 minutes | | | | | |
| Surface Tack: 10 = NO tack; 0 = 100% sticky | 10 | 2.8 | 9.6 | 9.8 | 9.9 |
| Physical Testing of Cured Elastomer | | | | | |
| Tensile Strength at Break (MPa) | 18.0 | 16.1 | 10.4 | 16.5 | 16.1 |
| % Elongation at Break | 229 | 169 | 197 | 207 | 331 |
| % Compression Set at 150° C. for 24 hours | 93 | 24 | 51 | 31 | 72 |

Sample #1 used the sulfur vulcanization "control" formulation described in TABLE 2. When 13.25 phr of total curative was utilized, no surface tackiness was observed (rating of 10 out of 10) after curing the elastomer in a hot air oven at 205° C. for 15 minutes. However, a very poor % compression set of 93% was observed. A 100% compression set represents a total and complete deformation under heat and stress, so a 93% value is nearly a complete failure for a sealing application, and reveals the poor heat-aging nature when such resins are subjected to sulfur vulcanization.

Sample #2 used a conventional organic peroxide Luperox® F40KE at 8.0 phr as the cure system in the EPDM masterbatch. The EPDM masterbatch cured with this standard peroxide exhibited considerable surface tackiness with a very poor rating of 2.8 out of a possible 10, after the 205° C. and 15 minute hot air oven cure process, and an excellent % compression set value of 24%.

Sample #3 used a formulation taught by U.S. Pat. No. 6,747,099, which includes HVA-2 (N,N'-m-phenylene dimaleimide) coagent to achieve a tack-free surface, along with an organic peroxide and a sulfur containing compound. Curing in a hot air oven at 205° C. for 15 minutes provided a good surface rating of 9.6 out of 10, but this formulation only provided an intermediate 51% compression set value in this EPDM compound.

Sample #4 used an organic peroxide formulation of the present invention, which does not include the expensive and toxic HVA-2 coagent required in prior art formulations. Sample #4 demonstrated unexpected physical properties with the use of select disulfide compounds and at least one organic peroxide. At only 8.0 phr total curative, Sample #4 provided a slightly higher crosslinking (MH−ML) in dN-m of the EPDM compared to the Sample #1 sulfur control, with an excellent tack-free surface cure rating of 9.8 out of 10 and a very unexpected low % compression set value of 31%, which outperformed the prior art sample #3 value of 51%. Sample #4 provided the lowest % compression set of all the samples tested in this example. This was highly unexpected, as the HVA-2 coagent is widely used for increasing organic peroxide crosslinking performance and lowering the compression set of crosslinked elastomers. Sample #4 provided a better hot air oven surface cure, higher crosslink density, a significantly higher (58% higher) tensile strength at break, and a lower % compression set. Sample #4 also unexpectedly provided 5% longer % Elongation at break, despite the higher crosslink density generated by this formulation, compared to Sample #3.

Sample #5 used an organic peroxide formulation of the present invention. Sample #5 further improved the hot air surface cure performance with a nearly perfect 9.9 rating out of 10. The crosslink density, surface tackiness, tensile strength and % elongation outperformed the prior art Sample #3. Sample #5 also had a significantly improved % compression set compared to the sulfur control, Sample #1. The % elongation was improved by 44% (331% vs. only 229%), which was highly unexpected.

Example 2

In this example, organic peroxide formulations were used to hot air cure a blend of EPDM and a poly(ethylene α-olefin) copolymer. EPDM can contain from roughly 5% and up to 9% unsaturation, both of which can be crosslinked by sulfur vulcanization. However, sulfur vulcanization cure systems cannot cure saturated polyethylene copolymers like EVA or poly(ethylene α-olefin) copolymers. TABLE 4 provides the the generic formulation that was used to evaluate a 54% and 46% blend of an EPDM and poly(ethylene α-olefin) copolymer.

TABLE 4

"EPDM + EP Masterbatch"

| EPDM | 54 |
|---|---|
| Poly(ethylene-α-olefin) | 46 |
| Carbon Black & Fillers | 240 |
| Process Oil | 89 |
| Total Ingredients | 429 |

TABLE 5

Standard and Novel Peroxide Formulation testing of
TABLE 4 "EPDM + EP Masterbatch"

| | Sample # | | | | | |
|---|---|---|---|---|---|---|
| | 1 | 2 | 3 | 4 | 5 | 6 |
| Table 4 "EPDM + EP Masterbatch" | 429 | 429 | 429 | 429 | 429 | 429 |
| phr Vul-Cup ® 40KE | 5.0 | 5.0 | 5.0 | 5.0 | 5.0 | 6.0 |
| phr HVA-2 ® | 2.5 | — | — | — | — | — |
| phr TMPTMA | — | — | — | — | — | 3.0 |
| phr Vultac ® 5 | 2.0 | — | — | 4.5 | — | — |
| phr MBTS | 0.5 | 0.67 | 0.67 | 0.67 | 0.67 | — |
| phr DTDM | — | 4.5 | — | — | — | — |
| phr Vultac ® 7 | — | — | — | — | 4.5 | — |
| phr CLD-80 | — | — | 4.5 | — | — | — |
| phr total curative | 10.0 | 10.17 | 10.17 | 10.17 | 10.17 | 9.0 |
| RPA Rheometer 185° C., 1° arc, 100 cpm, (1.677 Hz) | | | | | | |
| MH (dN-m) | 10.41 | 13.22 | 12.37 | 11.87 | 11.82 | 15.13 |
| MH − ML (dN-m) | 8.56 | 11.70 | 10.97 | 10.36 | 10.36 | 13.56 |
| Ts1 (min) | 0.41 | 1.20 | 0.84 | 0.67 | 0.79 | 0.58 |
| Ts2 (min) | 0.53 | 1.95 | 1.26 | 0.90 | 1.10 | 0.77 |
| Tc50 (min) | 0.85 | 3.46 | 2.74 | 1.66 | 2.19 | 1.43 |
| Tc90 (min) | 2.71 | 5.13 | 7.35 | 3.83 | 5.87 | 3.17 |
| Hot Air Oven Cure at 205° C. for 5 minutes | | | | | | |
| Surface Tack: 10 = no tack; 0 = 100% tacky | 0 | 10 | 10 | 8 | 9.5 | 0 |

Sample 1 used a formulation taught by U.S. Pat. No. 6,747,099, which includes the coagent HVA-2, along with an organic peroxide and a sulfur containing compound. HVA-2 is a fast-reacting coagent which results in a faster crosslinking reaction, thus shorter ts1 and ts2 scorch times, which can make mixing the elastomer more difficult. This Sample 1 formulation provided no improvement in surface tackiness over the standard peroxide of Sample 6. Both the prior art organic peroxide formulation (Sample 1) and the standard organic peroxide cure system (Sample 6) provided a poor surface cure rating of 0.

The standard peroxide cure system in Sample 6 provided the highest amount of crosslinking (MH−ML) in dN-m, which shows that the amount of crosslinking of the rubber has little to do with oxygen inhibition of crosslinking at the rubber surface.

In contrast, Samples 2, 3, 4 and 5, which used organic peroxide formulations of the present invention, provided excellent surface cure performance with ratings of 10, 10, 8 and 9.5, respectively, in the EPDM and poly(ethylene α-olefin) copolymer blend. Furthermore, these compositions provided unexpectedly longer scorch times, based on Ts1 and Ts2 minutes values. Longer scorch times are desirable for continuous extrusion operations.

Example 3

In this example, organic peroxide formulations were used to hot air cure poly(ethylene vinyl acetate) (EVA). One of the main advantages of organic peroxide cure systems is their ability to crosslink fully saturated polymers. One such useful polymer is poly(ethylene vinyl acetate) or EVA. As shown in TABLE 6, an organic peroxide formulation of the present invention, labeled "SYSTEM-F90," was used to cure EVA in a hot air oven at 205° C. for 15 minutes, and was compared to a standard organic peroxide formulation consisting of only Luperox® F40KEP.

TABLE 6

| "SYSTEM-F90" | |
|---|---|
| Luperox ® F90P | 66.67% |
| Vultac ® 5 | 26.67% |
| MBTS | 6.66% |

The "SYSTEM-F90" peroxide formulation was tested to see if it could successfully hot air cure the EVA Elastomer formulation described in TABLE 7, which is a fully saturated polymer that cannot be sulfur cured. The EVA Elastomer formulation was cured in a hot air oven at 205° C. for 15 minutes with the "SYSTEM-F90" formulation (2.125 phr), and with Luperox® F40KEP (2.125 phr). Crosslinking the EVA sheet in a hot air oven provided a significantly improved cured surface with SYSTEM-F90, which had a surface tackiness rating of 9.5 in accordance with the Facial Tissue Paper Test, compared to the standard peroxide Luperox® F40KEP, with a surface tackiness rating of 6.0 using the Facial Tissue Paper Test.

TABLE 7

| EVA Elastomer Formulation | |
|---|---|
| | phr |
| Evatane ® 3345PV | 100 |
| N550 carbon black | 100 |
| Primol ® 352 process oil | 40 |
| Polyethylene glycol | 3 |
| Stanguard ® TMQ Powder | 1 |
| Total | 244 |

Example 4

In this example, organic peroxide formulations were used to hot air cure the "EPDM MB" rubber compound described in TABLE 1. The organic peroxide formulations were similar to the "SYSTEM-F90" formulation provided in TABLE 6, except the Luperox® F90P component was replaced with other peroxides to produce "SYSTEM-101", "SYSTEM-DCP" and "SYSTEM-231" formulations shown in TABLE 8, while keeping the other additives the same. The peroxide concentration used in each formulation was adjusted on an equal active oxygen content using Luperox® F90P as the control.

TABLE 8

Examples of Organic Peroxide Formulations for Crosslinking Elastomers in a Hot Air Oven, as Taught in Embodiments of this Invention

| | Formulation name | | | |
|---|---|---|---|---|
| | SYSTEM-F90 | SYSTEM-101 | SYSTEM-DCP | SYSTEM-231 |
| Parts per 100 rubber | phr | phr | phr | phr |
| Luperox ® F90P | 5.336 | — | — | — |
| Luperox ® 101XL45 | — | 8.751 | — | — |
| Di-Cup ® R | — | — | 7.416 | — |
| Luperox ® 231XL40 | — | — | — | 10.417 |
| Vultac ® 5 | 2.136 | 2.136 | 2.136 | 2.136 |
| MBTS | 0.528 | 0.528 | 0.528 | 0.528 |
| Hot Air Oven Cure at 205° C. for 15 minutes | | | | |
| Surface Tack: 10 = no tack; 0 = 100% tacky | 10 | 10 | 10 | 10 |

These peroxide formulations listed in TABLE 8 were blended into the "EPDM MB" compound listed in TABLE 1, at the phr loadings provided in TABLE 8. The compounded EPDM sheets containing each of these peroxides were hot air cured in an oven using the standard procedure described herein, i.e., at 205° C. for 15 minutes. It was found that all of the peroxide formulations presented in TABLE 8 unexpectedly provided a tack-free surface after being cured in the hot air oven. This was determined based upon the lack of facial tissue paper adhering to the hot rubber surface, in accordance with the Facial Tissue Paper Test. In contrast, curing the same rubber sheet composition with only the corresponding standard peroxides (i.e., with formulations that included only the peroxide without the additives Vultac® 5 and MBTS) resulted in nearly complete covering of the rubber surface with tissue paper, indicating a poor surface cure.

Example 5

In this example, organic peroxide formulations were used to hot air cure the EPDM elastomer masterbatch described in TABLE 1. It was unexpectedly found that organophosphites blended with Luperox® F40KEP resulted in a substantially tack-free surface when crosslinking in a hot air oven, as shown in TABLE 9. The EPDM elastomer masterbatch is described in TABLE 1 and the sulfur control is described in TABLE 2. The data in TABLE 9 (particularly Sample #'s 4, 6, 7 and 8, which had substantially tack-free surfaces) illustrate the effectiveness of the organophosphites in providing surfaces with less tackiness than the standard peroxide shown in Sample #2, TABLE 9.

TABLE 9

Effect of Phosphite Additives on Surface Tackiness when using Organic Peroxides Curing EPDM in a Hot Air Oven at 205° C., 15 min

| | Sample # | | | | | | | |
|---|---|---|---|---|---|---|---|---|
| | 1 | 2 | 3 | 4 | 5 | 6 | 7 | 8 |
| EPDM Masterbatch (Table 1) parts | 244 | 244 | 244 | 244 | 244 | 244 | 244 | 244 |
| phr Sulfur Cure (Table 2) | 13.25 | — | — | — | — | — | — | — |
| phr Luperox ® F40KEP | — | 8.0 | 8.0 | 8.0 | 8.0 | 8.0 | 8.0 | 8.0 |
| phr Irgafos ® 168 | — | — | 1.0 | 3.0 | 5.0 | — | — | — |
| phr TPP (triphenyl phosphite) | — | — | — | — | — | 1.0 | 3.0 | 5.0 |
| RPA Rheometer Cure at 185° C., 1° arc, 100 cpm (1.667 Hz) | | | | | | | | |
| MH − ML (dN-m) | 26.78 | 28.30 | 26.31 | 21.83 | 18.18 | 26.00 | 16.46 | 9.67 |
| Hot Air Oven Cure at 205° C., 15 minutes, then Surface Tack Testing with Facial Tissue | | | | | | | | |
| Surface Tack: 10 = no tack; 0 = 100% tacky | 10 | 0 | 7.5 | 8.4 | 7.2 | 8.8 | 8.7 | 9.2 |

Example 6

In this example, organic peroxide formulations were used to hot air cure the EPDM elastomer masterbatch described in TABLE 1. It was unexpectedly found that HALS (Hindered Amine Light Stabilizers) blended with Luperox® F40KEP resulted in a substantially tack-free surface when crosslinking in a hot air oven, as shown in TABLE 10. The EPDM elastomer masterbatch is described in TABLE 1 and the sulfur control is described in TABLE 2. The data in TABLE 10 show that the use of various HALS (particularly in Sample #'s 4, 7 and 8) provided a better cure performance (MH−ML in dN-m) and surfaces with less tackiness compared to the standard peroxide shown in Sample #2, TABLE 10.

TABLE 10

Effect of Hindered Amine Light Stabilizer Additives on Surface Tackiness when using Organic PeroxidesCuring EPDM in a Hot Air Oven at 205° C., 15 min

| | Sample # | | | | | | | |
|---|---|---|---|---|---|---|---|---|
| | 1 | 2 | 3 | 4 | 5 | 6 | 7 | 8 |
| Parts EPDM Masterbatch Table 1 | 244 | 244 | 244 | 244 | 244 | 244 | 244 | 244 |
| phr Sulfur Cure (Table 2) | 13.25 | — | — | — | — | — | — | — |
| phr Luperox ® F40KEP | — | 8.0 | 8.0 | 8.0 | 8.0 | 8.0 | 8.0 | 8.0 |
| phr Tinuvin ® 770 | — | — | 1.0 | 3.0 | 5.0 | — | — | — |
| phr Chimassorb ® 994 | — | — | — | — | — | 1.0 | 3.0 | 5.0 |
| RPA Rheometer Cure at 185° C., 1° arc, 100 cpm (1.667 Hz) | | | | | | | | |
| MH − ML (dN-m) | 26.78 | 28.30 | 27.13 | 25.20 | 24.40 | 26.72 | 24.53 | 22.63 |
| Hot Air Oven Cure at 205° C., 15 minutes, then Surface Tack Testing with Facial Tissue | | | | | | | | |
| Surface Tack: 10 = no tack; 0 = 100% tacky | 10 | 0 | 6.5 | 8.5 | 6.5 | 5.0 | 9.0 | 8.0 |

Example 7

In this example, organic peroxide formulations were used to hot air cure the EPDM elastomer masterbatch described in TABLE 1. It was unexpectedly found that CN9102® aliphatic allyl urethane blended with Luperox® F40KEP resulted in a substantially tack-free surface when crosslinking in a hot air oven, as shown in TABLE 11.

TABLE 11

CN9102 ® aliphatic allyl urethane is capable of providing a tack-free surface when curing elastomers in the presence of hot air with organic peroxides Curing EPDM in a Hot Air Oven at 205° C., 15 min

| | Sample # | | |
|---|---|---|---|
| | 1 | 2 | 3 |
| EPDM Masterbatch (from Table 1) parts | 244 | 244 | 244 |
| phr Vul-Cup ® 40KE | 6.0 | 6.0 | 6.0 |
| phr CN9102 ® from Sartomer | 3.0 | 6.0 | 10.0 |
| RPA Rheometer Cure at 185° C., 1° arc, 100 cpm (1.667 Hz) | | | |
| ML (dN-m) | 1.33 | 1.28 | 1.18 |
| MH (dN-m) | 15.47 | 16.55 | 13.45 |
| MH − ML (dN-m) | 26.78 | 28.30 | 27.13 |
| Ts1 (min) | 0.46 | 0.46 | 0.50 |
| Tc90 (min) | 1.59 | 1.62 | 1.64 |
| Hot Air Oven Cure at 205° C., 15 minutes, then Surface Tack Testing with Facial Tissue | | | |
| Surface Tack: 10 = no tack; 0 = 100% tacky | 9.8 | 8.5 | 10 |

Example 8

In this example, illustrated in TABLE 12, a monoperoxycarbonate type organic peroxide (Luperox® TBEC) was blended with sulfur-containing compounds to cure the EPDM Masterbatch of Table 1 in hot air. This peroxide formulation unexpectedly provided a tack-free surface with a 10 rating (completely tack-free) after curing in the hot air oven. Luperox® TBEC decomposes faster than Vul-Cup® 90 due to the lower half-life at 185° C., however the advantage is the significantly shorter cure time (Tc90 minutes).

TABLE 12

Using Luperox ® TBEC to provide a tack-free surface in the presence of atmospheric oxygen when curing EPDM in a Hot Air Oven at 205° C. for 15 min, as per the practice of our invention

| | Sample # | | |
|---|---|---|---|
| | 1 | 2 | 3 |
| EPDM Masterbatch (from Table 1) parts | 244 | 244 | 244 |
| phr Vul-Cup ® 90P | 5.61 | — | — |
| phr Luperox ® TBEC | — | — | 9.0 |
| phr Vultac ® 5 | — | 1.9 | 2.7 |
| phr MBTS | — | 0.47 | 0.70 |
| RPA Rheometer Cure at 185° C., 1° arc, 100 cpm (1.667 Hz) | | | |
| MH − ML (dN-m) | 34.72 | 25.04 | 14.98 |
| Tc90 (min) | 3.31 | 3.03 | 0.40 |
| Hot Air Oven Cure at 205° C., 15 minutes, then Surface Tack Testing with Facial Tissue | | | |
| Surface Tack: 10 = no tack; 0 = 100% tacky | 0 | 10 | 10 |

Example 9

In this example, scorch time was increased while providing a desirable tack-free surface cure of an EPDM compound in a hot air oven (at 205° C., 15 min) when using organic peroxide formulations of the present invention. A longer scorch time, higher amount of crosslinking, and shorter cure time were obtained with the synergistic blend of 4-hydroxy TEMPO and MTBHQ with sulfur-containing compounds and Luperox® F90P.

The unexpected synergy may be described by using the equation:

$$\text{Efficiency} = [(MH-ML) \times Ts2] \div (Tc90-Ts2),$$

where a higher efficiency value indicates a higher efficiency of scorch time with respect to the effect on state of cure and cure time for the peroxide formulation.

TABLE 13

Increasing Scorch Time while Providing a Tack-free Surface Cure when using Organic Peroxides to Cure EPDM in a Hot Air Oven at 205° C., 15 min

| | Sample # | | | | | |
|---|---|---|---|---|---|---|
| | 1 | 2 | 3 | 4 | 5 | 6 |
| Parts EPDM MB Table 1 | 244 | 244 | 244 | 244 | 244 | 244 |
| phr Sulfur Cure (Table 2) | 13.25 | — | — | — | — | — |
| phr Luperox® F90P | — | 5.61 | 4.31 | 4.88 | 4.88 | 4.88 |
| phr Vultac® 5 | — | — | 1.72 | 1.95 | 1.95 | 1.95 |
| phr 4-hydroxy TEMPO | — | — | — | 0.92 | 0.46 | — |
| phr MTBHQ | — | — | — | — | 0.46 | 0.92 |
| phr MBTS | — | — | 0.43 | 0.48 | 0.48 | 0.48 |
| RPA Rheometer Cure at 185° C., 1° arc, 100 cpm (1.667 Hz) | | | | | | |
| Ts2 scorch time (min.) | 0.73 | 0.39 | 0.51 | 0.56 | 0.67 | 0.72 |
| Tc90 (minutes) | 6.17 | 3.31 | 3.03 | 3.19 | 3.39 | 3.50 |
| MH − ML (dN-m) | 22.31 | 34.72 | 25.04 | 20.77 | 21.13 | 18.83 |
| Efficiency | 2.99 | 4.64 | 5.07 | 4.42 | 5.20 | 4.88 |
| Hot Air Oven Cure at 205° C., 15 minutes, then Surface Tack Testing with Facial Tissue | | | | | | |
| Surface Tack: 10 = no tack; 0 = very tacky | 10 | 0 | 10 | 9.8 | 10 | 9.8 |

The formulation provided in Sample #5 of TABLE 13 provides a huge EFFICIENCY value of 5.20 versus only 2.99 for the sulfur cure control provided in Sample #1. The increased scorch time with respect to cure time for Sample #5 was achieved by the blend of 0.46 phr 4-hydroxy TEMPO with 0.46 phr MTBHQ for a total of 0.92 phr for the 50:50 blend. This EFFICIENCY of 5.20 is larger than the 4.42 value obtained by Sample #4 with the use of 0.92 phr 4-hydroxy TEMPO, and also larger than 4.88 for Sample #6 with the use of 0.92 phr MTBHQ. Furthermore, the final hot air oven cured surface for Sample #5 was higher, with a score of 10 (i.e., completely tack-free). Thus, Sample #5 of TABLE 13 provides not only a completely tack-free surface when cured in the presence of atmospheric oxygen using a hot air oven, but a desirable longer scorch time for better extrusion and processing prior to cure.

One advantage of the present invention peroxide formulations is the ability to utilize existing sulfur cure processing and crosslinking equipment that are currently present in manufacturing plants, while being able to replace sulfur cure with an organic peroxide with little to no adjustments to the manufacturing operations. The added benefit is improved productivity, by reducing cycle time due to the lower Tc90, while significantly improving the crosslinked rubber's physical properties. The carbon-carbon bond crosslinks generated by an organic peroxide enables one to better utilize all the engineering capabilities of the elastomer, as this is a structure that exists in the polymer backbone itself.

Example 10

Curing Vamac® DP, a Poly(Ethylene Acrylate) Copolymer in 200° C. Hot Air Oven for 15 Minutes.

TABLE 14

| | Run # | |
|---|---|---|
| | 1 | 2 |
| DuPont VAMAC® DP | 100.00 | 100.00 |
| N550 carbon black | 87.00 | 87.00 |
| Chemtura Naugard® 445 | 1.00 | 1.00 |
| Stearic Acid | 0.50 | 0.50 |
| R. T. Vanderbilt Vanfre® VAM | 0.50 | 0.50 |
| Arkema Di-Cup® 40C | 6.00 | 5.89 |
| Arkema MLPC, Vultac® 5 | 0.00 | 0.09 |
| R. T. Vanderbilt Altax® (MBTS) | 0.00 | 0.02 |
| 72% TAIC on silica | 2.00 | 0.00 |
| Sartomer SR-350 (TMPTMA) | 0.00 | 1.75 |
| RPA 173C, 1° arc, 100 cpm: MH (dN-m) | 17.90 | 20.40 |
| Crosslinking in a 200° C. hot air oven for 15 minutes, followed by the tackiness test. | | |
| Facial Tissue Tackiness Test where: 10 = no tack; 0 = 100% tacky | 0 | 8 |

In Example 10, TABLE 14 shows crosslinking of a poly(ethylene acrylate) elastomer called Vamac® DP. Using a novel blend (Run #2) of dicumyl peroxide, Vultac® 5 a poly(t-amylphenol disulfide), MBTS (mercaptobenzothiazole disulfide), and TMPTMA (trimethylolpropane trimethacrylate) the elastomer is crosslinked in a hot air oven at 200° C. for 15 minutes, providing a very good cured surface with a rating of 8 out of 10 based on the facial tissue paper test. The standard peroxide system (Run #1) which uses a coagent TAIC provided a sticky surface with a rating of 0 out of 10.

Example 11

Curing EPDM Elastomer in 205° C. Hot Air Oven for 15 Minutes

TABLE 15

| | Run # | |
|---|---|---|
| | 1 | 2 |
| ExxonMobil Vistalon® 2504 EPDM | 100.00 | 100.00 |
| N550 Carbon Black | 270.00 | 270.00 |
| Sunpar® 2280 process oil | 160.00 | 160.00 |
| Stanguard® TMQ Powder antioxidant | 2.00 | 2.00 |
| Arkema Luperox® F90P | 0.00 | 4.66 |
| Arkema Luperox® 101 | 9.33 | 4.66 |
| Arkema MLPC Vultac® 5 | 3.73 | 3.73 |
| R. T. Vanderbilt Altax® (MBTS) | 0.94 | 0.94 |
| RPA, 200° C., 1° arc, 100 cpm: MH (dN-m) | 7.64 | 4.25 |
| Hot air oven curing @205° C. for 15 minutes followed by the tack test | | |
| Facial Tissue Tackiness Test where: 10 = no tack; 0 = 100% tacky | 10 | 10 |

In this example an EPDM formulation is cured using two novel peroxide blends as taught in the practice of our invention. The first peroxide composition (Run #1), is a novel blend of Luperox® 101 whose chemical name is 2,5-dimethyl-2,5-di(t-butylperoxy)hexane with Vultac® 5 and MBTS. The second composition (Run #2), is a novel blend of Luperox® F90P whose chemical name is m/p-di(t-butylperoxy)diisopropylbenzene, Luperox® 101 whose chemical name is 2,5-dimethyl-2,5-di(t-butylperoxy)hexane, together with Vultac® 5 and MBTS. Both of these novel formulations resulted in a fully cured surface when the elastomer was cured in a hot air oven at 205° C. for 15 minutes.

Example 12

Curing EPDM Elastomer in 205° C. Hot Air Oven for 15 Minutes

TABLE 16

| | Sample # | | |
|---|---|---|---|
| | 1 | 2 | 3 |
| Parts EPDM MB Table 1 | 244 | 244 | 244 |
| phr Luperox ® F90P | 3.85 | 3.85 | 3.85 |
| phr Vultac ® 5 | 1.54 | 1.54 | 1.54 |
| phr MBTS | 0.38 | 0.38 | 0.38 |
| phr 4-OHT | 0.36 | 0.36 | 0.36 |
| phr MTBHQ | 0.36 | 0.36 | 0.36 |
| phr TAC (triallyl cyanurate) | 1.20 | — | — |
| phr TAIC (triallyl isocyanurate) | — | 1.20 | — |
| phr TMPTMA (trimethylolpropane trimethacrylate) | — | — | 1.20 |
| RPA Rheometer Cure at 185° C., 1° arc, 100 cpm (1.667 Hz) 15 minutes | | | |
| ML (dN-m) | 1.32 | 1.30 | 1.31 |
| MH (dN-m) | 19.41 | 19.52 | 23.69 |
| MH − ML (dN-m) | 18.09 | 18.21 | 22.38 |
| Ts1 scorch time (min.) | 0.55 | 0.55 | 0.56 |
| Ts2 scorch time (min.) | 0.70 | 0.70 | 0.71 |
| Tc50 (minutes) | 1.49 | 1.50 | 1.85 |
| Tc90 (minutes) | 3.47 | 3.46 | 4.14 |
| Hot air oven curing at 205° C. for 15 min, then the facial tissue testing. | | | |
| Surface Tack: | 10 | 10 | 10 |
| 10 = no tack; | | | |
| 0 = 100% tacky | | | |

Example 12 illustrates three novel peroxide blends which all provided excellently cured EPDM elastomers with No Tack (rating 10 out of 10) wherein these novel peroxide blends had three things in common: Luperox® F90P, Vultac® 5, MBTS wherein the crosslinking coagent was either TAC, TAIC or TMPTMA, as part of the novel composition to increase the state of cure while still providing a 100% tack-free hot air cured surface.

What is claimed is:
1. An organic peroxide formulation consisting of:
at least one organic peroxide; and
at least one organophosphite compound,
optionally at least one coagent and/or at least one filler,
optionally one or more additional compounds selected from the group consisting of: HALS compounds, nitroxide-containing compounds, quinone-containing compounds, aliphatic allyl urethane compounds, drying oils, cellulose compounds, and a combination thereof,
optionally at least one crosslinking agent,
optionally at least one additive selected from the group consisting of process oils, process aids, pigments, dyes, tackifiers, waxes, reinforcing aids, UV stabilization agents, blowing agents, scorch protectors, activators, and antiozonants;
wherein the amounts of the at least one organic peroxide and the at least one organophosphite compound are selected such that the formulation is capable of curing an elastomer composition comprising at least one elastomer which is ethylene-propylene-diene terpolymer (EPDM) in the full or partial presence of oxygen.

2. The organic peroxide formulation of claim 1, wherein the at least one organophosphite compound is selected from the group consisting of tris(2,4-di-tert-butylphenyl) phosphite, triphenyl phosphite, phenyl didecyl phosphite, diphenyl isodecyl phosphite, tris-nonylphenyl phosphite, and 4,4'-isopropylidene diphenol alkyl (C12-C15) phosphite, and a combination thereof.

3. The organic peroxide formulation of claim 1, wherein the organic peroxide is selected from the group consisting of dialkyl peroxides, peroxyketals, diperoxyketals, monoperoxy carbonates, cyclic ketone peroxides, diacyl peroxides, organosulfonyl peroxides, peroxyesters, and solid, room temperature stable peroxydicarbonates.

4. The organic peroxide formulation of claim 1, wherein the organic peroxide is selected from the group consisting of 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butylperoxybenzoate; t-butylperoxyacetate; t-butylperoxymaleic acid; di(4-methylbenzoyl)peroxide; dibenzoyl peroxide; di(2,4-dichlorobenzoyl)peroxide; dilauroyl peroxide; cumene hydroperoxide; and di(4-tert-butylcyclohexyl)peroxydicarbonate.

5. The organic peroxide formulation of claim 1 including at least one coagent and/or at least one filler.

6. The organic peroxide formulation of claim 1 including one or more additional compounds selected from the group consisting of: HALS compounds, nitroxide-containing compounds, quinone-containing compounds, aliphatic allyl urethane compounds, drying oils, cellulose compounds, and a combination thereof.

7. The organic peroxide formulation of claim 1 including at least one crosslinking agent.

8. The organic peroxide powder formulation of claim 7, wherein the at least one crosslinking agent is selected from the group consisting of allyl methacrylate oligomer, triallyl cyanurate, triallyl isocyanurate, trimethyloylpropane trimethacrylate, trimethyloylpropane triacrylate, zinc diacrylate, and zinc dimethacrylate.

9. A method for manufacturing the organic peroxide formulation of claim 1 comprising mixing the at least one organic peroxide and the at least one organophospite compound.

10. An elastomer composition comprising:
at least one elastomer which is ethylene-propylene-diene terpolymer (EPDM); and
the organic peroxide formulation of claim 1,
wherein the elastomer composition is curable in the full or partial presence of oxygen.

11. A process for curing an elastomer composition, said process comprising:
curing an elastomer composition in the presence of oxygen, wherein the elastomer composition comprises at least one elastomer which is ethylene-propylene-diene terpolymer (EPDM), and the organic peroxide formulation of claim 1.

* * * * *